United States Patent
Edmund et al.

(10) Patent No.: US 10,366,461 B2
(45) Date of Patent: Jul. 30, 2019

(54) AUTOMATED DOCUMENT ANALYSIS FOR VARYING NATURAL LANGUAGES

(71) Applicant: AON RISK SERVICES, INC. OF MARYLAND, New York, NY (US)

(72) Inventors: William Michael Edmund, Lynnwood, WA (US); Daniel Crouse, Seattle, WA (US); John E. Bradley, III, Duvall, WA (US)

(73) Assignee: AON RISK SERVICES, INC. OF MARYLAND, New York, NY (US)

( * ) Notice: Subject to any disclaimer, the term of this patent is extended or adjusted under 35 U.S.C. 154(b) by 0 days.

(21) Appl. No.: 15/451,138

(22) Filed: Mar. 6, 2017

(65) Prior Publication Data
US 2018/0253810 A1    Sep. 6, 2018

(51) Int. Cl.
*G06Q 50/18* (2012.01)
*G06F 17/24* (2006.01)
*G06F 17/27* (2006.01)

(52) U.S. Cl.
CPC ........... *G06Q 50/184* (2013.01); *G06F 17/24* (2013.01); *G06F 17/274* (2013.01); *G06F 17/275* (2013.01); *G06F 17/2705* (2013.01); *G06F 17/2795* (2013.01)

(58) Field of Classification Search
CPC ........... G06F 17/2785; G06F 17/30011; G06F 2216/11; G06F 17/27; G06F 17/3053
See application file for complete search history.

(56) References Cited

U.S. PATENT DOCUMENTS

| 7,503,000 B1 * | 3/2009 | Kreulen | G06F 17/30616 |
| | | | 707/999.007 |
| 2004/0093321 A1 * | 5/2004 | Roustant | G06F 17/30867 |
| 2005/0086224 A1 * | 4/2005 | Franciosa | G06F 17/30011 |
| 2005/0120011 A1 | 6/2005 | Dehlinger et al. | |
| 2007/0073748 A1 * | 3/2007 | Barney | G06F 17/30675 |

(Continued)

OTHER PUBLICATIONS

PCT Invitation to Pay Additional Fees dated Apr. 23, 2018 for PCT Application No. PCT/US18/20382, 3 pages.

(Continued)

*Primary Examiner* — Douglas Godbold
*Assistant Examiner* — Mark Villena
(74) *Attorney, Agent, or Firm* — Lee & Hayes, P.C.

(57) ABSTRACT

Manual human processing of documents often generates results that are subjective and include human-error. The cost and relatively slow speed of manual, human analysis makes it effectively impossible or impracticable to perform document analysis at the scale, speed, and cost desired in many industries. Accordingly, it may be advantageous to employ objective, accurate rule-based techniques to evaluate and process documents. This application discloses data processing equipment and methods specially adapted for a specific application: analysis of the breadth of documents. The processing may include context-dependent pre-processing of documents and sub-portions of the documents. The sub-portions may be analyzed based on word count and commonality of words in the respective sub-portions. The equipment and methods disclosed herein improve upon other automated techniques to provide document processing by achieving a result that quantitatively improves upon manual, human processing.

20 Claims, 8 Drawing Sheets

(56) References Cited

U.S. PATENT DOCUMENTS

| | | | |
|---|---|---|---|
| 2009/0112642 A1* | 4/2009 | Uekane | G06F 17/30719 705/7.38 |
| 2009/0228777 A1* | 9/2009 | Henry | G06F 17/30017 715/230 |
| 2009/0300046 A1* | 12/2009 | Abouyounes | G06F 17/30265 |
| 2010/0005061 A1* | 1/2010 | Basco | G06F 17/3071 704/9 |
| 2011/0191098 A1* | 8/2011 | Thomas | G06F 17/27 704/9 |
| 2012/0109642 A1* | 5/2012 | Stobbs | G06F 17/2785 704/9 |
| 2012/0117082 A1 | 5/2012 | Koperda et al. | |
| 2013/0110839 A1 | 5/2013 | Kirshenbaum | |
| 2013/0282599 A1* | 10/2013 | Kang | G06Q 10/10 705/310 |
| 2015/0150023 A1* | 5/2015 | Johnson | G06F 9/5027 718/107 |
| 2016/0352772 A1* | 12/2016 | O'Connor | H04L 63/145 |
| 2017/0109449 A1* | 4/2017 | Johns | G06F 17/30867 |

OTHER PUBLICATIONS

The PCT Search Report and Written Opinion dated Jun. 27, 2018, for PCT Application No. PCT/US18/20382, 13 pages.

\* cited by examiner

| CLAIM NO. 200 | PATENT NO. 202 | BREADTH 204 | RANKING 206 | CLAIM LANGUAGE 208 | ANOMALIES 210 |
|---|---|---|---|---|---|
| 1 | 349,983 | 85 | 1 | A method comprising; accessing a first... | |
| 7 | 789,555 | 72 | 2 | A system including a processor and a memory comprising; a connection module... | Possible dependent claim |
| 1 | 948,934 | 65 | 3 | A method for remote access comprising; identifying the address... | |
| 13 | 824,089 | 31 | 4 | Computer-readable media storing instructions comprising; determine port availability... | Possible normative language |

FIG. 2

AUTOMATED DOCUMENT ANALYSIS FOR VARYING NATURAL LANGUAGES

BACKGROUND

The amount of information contained in documents is rapidly increasing. There are many industries such as law, education, journalism, politics, economics, etc. that may benefit from rapid and low-cost document analysis. The cost and relatively slow speed of manual, human analysis makes it effectively impossible or impracticable to perform document analysis at the scale, speed, and cost desired in many industries. "Offshoring" to take advantage of lower costs may allow the hiring of a larger number of people to analyze documents at a lower price per hour of labor. Even so, there is a lower bound on costs and an upper bound on throughput. Using multiple different people to provide manual analysis also has a strong potential to introduce inconsistencies because of variation in different individuals' subjective judgment. For example, analyzing a corpus of a million 30-page text documents overnight would be impossible using only human analysis. Automated document analysis using computers is much quicker than human analysis and performs at much lower cost. Additionally, automated document analysis provides for consistent and objective analysis that reduces discrepancies seen with subjective, error-prone human analysis. Further, human analysis is often difficult and impractical when analyzing documents in different languages. In order to analyze documents in a large number of languages, large amounts of humans which speak different languages and are trained to analyze the documents are required. Thus, devices and methods that can analyze documents in a way that emulates human analysis, and are applicable to a large number of languages, will have broad application across many different industries.

SUMMARY

Documents stored in one or more data repositories may be accessed automatically by one or more computing devices and analyzed based on one or more rule sets. The format, structure, and contents of any document stored in the data repositories may be initially unknown. Thus, part of the analysis may include filtering documents from a data repository and pre-processing the documents to identify those that are suitable for further analysis and to prepare the content of the documents for analysis. Examples of document types that may be analyzed include, but are not limited to, issued patents and published patent applications. The analysis may focus on specific portions of the documents such as, for example, abstracts or patent claims. Pre-processing may modify the document portions by standardizing the content and removing content that could negatively affect subsequent analysis through techniques such as stop word removal, stemming, and removal of duplicate words.

Breadth of the document portions is analyzed based on consideration of word count and commonality of words. Thus, the number of unique words and the frequency with which those words appear in other document portions are the basis for automatically assigning a breadth value to a given document portion. For a given document portion, the word count is compared to the word count of other document portions in the same analysis. Similarly, a commonness score is determined for the given document portion based on the commonality of words in that document portion as compared to the commonality of words in other document portions from the same analysis.

If the document portion is a patent claim, the breadth value represents an automatically-estimated scope of a property right relative to other patent claims that are part of the same analysis. Thus, the document analysis is able to automatically determine that claim A is broader than claim B. This analysis is human-emulative because the results are similar to those achieved by manual, human analysis, but superior to human analysis by reducing subjective scoring and human-error.

In some examples, the techniques may be applied to patent claims for applications in differing jurisdictions and written in differing languages. In some examples, the techniques may translate the patent claim language into English (or another language) and analyze the claims, while in other examples, no translation is needed and the patent claims may be analyzed in various foreign languages. In various examples, varying substantive law that is jurisdiction-specific may be taken into account when analyzing patent claims in different jurisdictions. For example, words in the preamble of claims for Chinese patent claims may be given weight for patent claim breadth, whereas the preamble of claims for patent applications in the United States may not be given weight for determining claim breadth. In some examples, patent claims in different types of jurisdiction patent applications may be analyzed in various ways. For example, to determine breath for patent claims in utility model patents filed in a jurisdiction, such as China, the utility model patent may have a scaling factor applied to it based on claim breadth scores determined for invention patents filed in that jurisdiction. Further discussion of these techniques for international claims are discussed below.

Breadth scores for various document portions analyzed together may be compared to generate a ranking of the document portions based on relative breadth scores. A user interface is generated that shows unique document identification numbers and corresponding breadth scores and/or rankings of document portions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 2 shows one example implementation of the user interface of FIG. 1.

DETAILED DESCRIPTION

Figure 1:
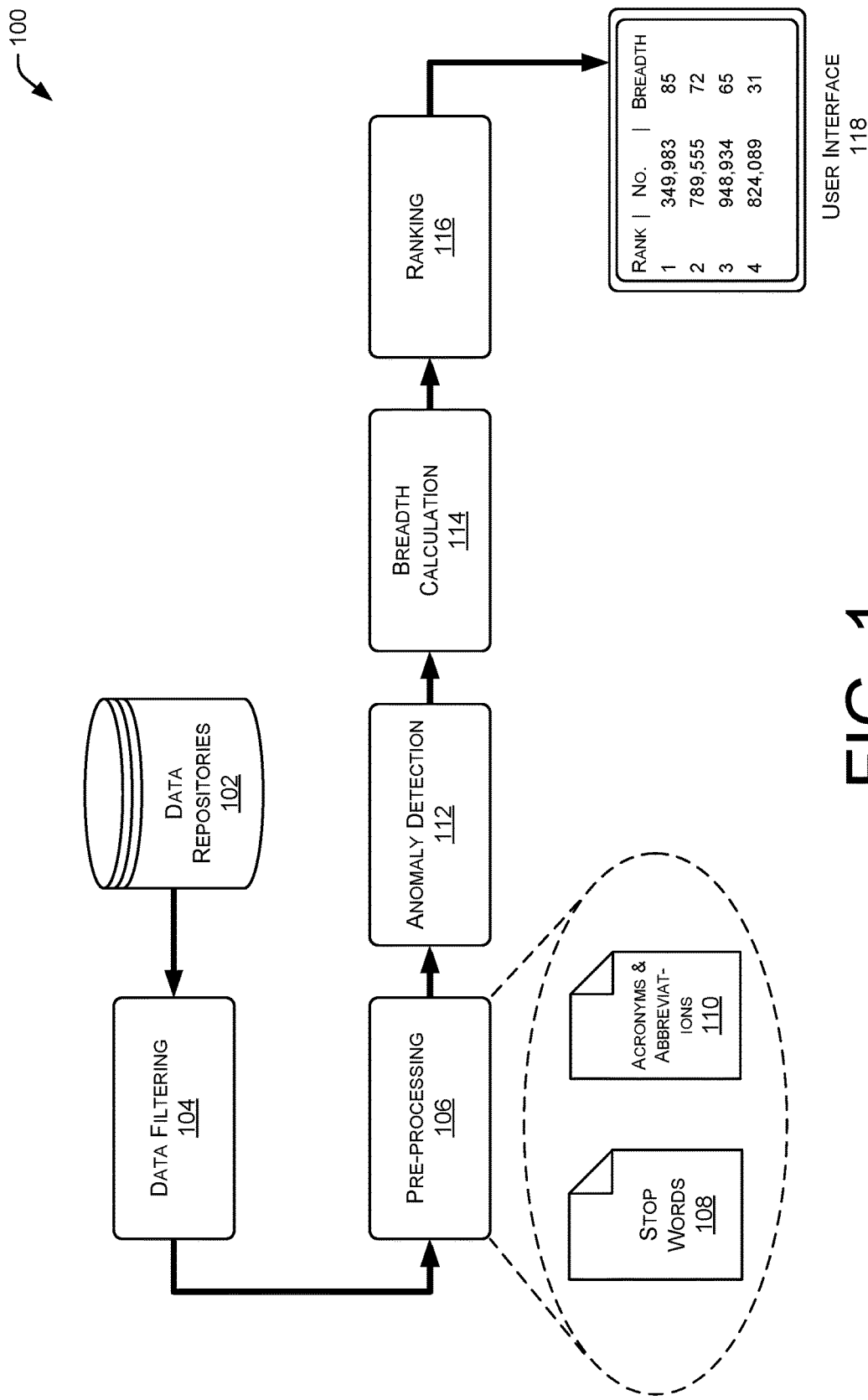
FIG. 1 shows an example processing pipeline for generating a user interface showing the results of automatic document analysis.

FIG. 1 shows an example analysis pipeline 100 for automatically analyzing and presenting breadth information derived from multiple documents. The documents may come from one or more data repositories 102. The documents may be any type of document such as issued patents, published patent applications, scholarly articles, news articles, financial statements, etc. The documents may also be available in any one of multiple different formats such as plaintext, hypertext markup language (HTML), comma separated values (CSV), or images such as portable document format (PDF) or Tag Image File Format (TIFF) files. In some document formats such as, for example, HTML and CSV portions and attributes of the documents may be individually identified. For example, the patent number may be placed in a column for patent numbers in a CSV file or labeled with a tag <patent number> in an HTML file. Similarly, the claim section may be identified as a claim section. In other file formats, such as, for example plaintext or PDF, the documents may not contain any such identifying information or metadata.

The format and/or file type of documents received from one of the data repositories 102 may be initially unknown when that document enters the analysis pipeline 100. Thus, at the start, part of the initial analysis may include identifying the file format and/or type of document. Some level of processing may be necessary for all documents and certain types of files such as image files or text files lacking metadata may require more extensive processing before further analysis can begin. In one implementation, the data repositories 102 may include both issued patents and published applications for utility, design, and/or plant patents. Patent data from various jurisdictions and in various languages may also be included in the data repositories 102. Examples of data repositories 102 include a patent database provided by Innography®, the U.S. Patent Database maintained by the United States Patent Trademark Office, patent data maintained by Relecura, as well as patent databases maintained by others such as the patent offices of various jurisdictions.

Data filtering 104 can limit the data obtained from the data repositories 102 to a corpus of documents that share specified characteristics. This may be particularly useful when the documents come from multiple different sources and/or the documents are obtained without knowledge of the document format. For example, the data filtering 104 may limit patent documents to only issued patents and exclude published patent applications. Data filtering 104 may filter by patent type and, for example, keep utility patents while excluding design and plant patents. Data filtering 104 may also filter documents by language, by author, by inventor, by assignee, by technical field, by classification, etc. Filters may be specified by user-generated input through a user interface. In one implementation, the user interface for specifying how data is to be filtered may be a command-line interface. Arguments passed on the command line are parsed by appropriate code to determine an input data set and/or filters to apply to incoming data.

Pre-processing 106 modifies the documents or portions of the documents for later processing. Pre-processing 106 may include stripping out punctuation, removing stop words 108, converting acronyms and abbreviations 110 to full words, stemming, and/or removing duplicate words. Stop words 108 are words that are filtered out before additional processing. Punctuation may include any of the following marks: . , ! ? , ; : ' " @ # $ % ^ & * ( ) [ ] < > / \ . - - - °. Stop words usually refer to the most common words in a language. Stop words may include short function words such as "the" "is," "at," "which," and "on," as well as others. However, there is no universal list of stop words. Stop words 108 may be compared to individual documents or portions of the documents and any matching words removed. The stop words 108 may be included directly in the code of a pre-processing algorithm. Additionally or alternatively, the stop words 108 may be included in a list that is accessed to identify stop words 108. The list may be editable to add or remove stop words 108. Multiple lists of stop words 108 may be available. Particular stop words 108 may be selected based on the type of documents being analyzed. For example, patent specific stop words 108 may include words such as "method" or "comprising" that would not typically be included in a list of general stop words. Similarly, if the data filtering 104 restricts the documents to a specific technical area, the stop words 108 may include words specific to the technical area.

Anomaly detection 112 identifies portions of documents that likely include an anomaly which will result in the portion of the document being excluded from further analysis or being flagged to alert a human user that there may be reasons to manually review the flagged document portion. In one implementation, the analysis may be performed only on independent patent claims. However, the data filtering 104 and the pre-processing 106 may create document portions that include both independent and dependent patent claims. When this analysis is configured to recognize characteristics of dependent patent claims as being "anomalous," anomaly detection 112 can ignore or discard the portions of the documents that correspond to dependent claims. Due to the limits of automatic computer-based document analysis there are some characteristics which may be detectable but the automatic analysis system will be unable to properly analyze for breadth. Flagging or otherwise indicating such content allows humans to focus manual review efforts on only those document portions that were not fully amenable to the automatic analytical techniques.

Breadth calculation 114 determines the breadth of a document or of a portion of a document. Breadth is a subjective concept that is represented in a form amenable for automatic analysis by considering word count and commonality of words. Word count is simply the number of words in a document or document portion. Words may be counted based on the raw input following data filtering 104 or after some level of pre-processing 106. For example, word count may be performed after removal of duplicate words so that it is a word count of unique words. Also, word count may be performed before or after removing stop words 108. Similarly, word count may be performed before after converting acronyms and abbreviations 110 into their full word representations. In the context of patent claims, short claims are generally considered broader than longer claims.

Commonality of words represents the frequency that a given word is found within a corpus of documents or document portions. Generally the relevant corpus is subject to the pre-processing 106. For example, if the starting documents from the data repositories 102 were academic papers on chemistry, and preprocessing limited the corpus to the abstracts of those papers then the commonality of a word would be based on the frequency that word is found throughout all the abstracts. Common words correlate with greater breadth while the presence of infrequently found words indicates reduced breadth. In the context of patent claims, words that are often found in the technical field are generally considered broader, or less limiting, than uncommon words.

The breadth calculation 114 combines both word count and word commonality to assign a breadth score to a document or document portion. Specific techniques for determining word count, word commonality, and an overall breadth score are discussed below. Some documents may have multiple portions that are scored. For example, an abstract and an executive summary of a financial document could be scored. A single patent document may have multiple independent claims and each independent claim may be assigned a different breadth score. The breadth of a document may be the breadth of its broadest portion such as the broadest claim of a patent document. Alternatively, the breadth of a document may be the breadth of its narrowest portion (e.g., the narrower of the abstract or the executive summary) or alternatively a median or average of each of the individually scored portions of the document. For example, a patent document having 20 claims may receive a score for each of the claims and the overall score assigned to that document may be the average of the 20 breadth scores. In some implementations, the breadth calculation 114 may evaluate a patent and/or patent application based on the claim language and terms used in the claim relative to all the other claims against which the claim is to be compared. In one particular implementation, a claim from a particular patent or application is compared to all the claims in all the patents and/or patent applications in a particular class or subclass of a classification or taxonomy system (such as USPTO classification, for example).

The ranking 116 orders or ranks the analyzed documents. Breadth calculation 114 is performed within the context of the other documents in a corpus. Thus, a breadth score for document or portion of a document is not an absolute value but a relative value compared to other documents that are part of the same analysis. This design for the analysis is human-emulative because it captures the idea of comparing apples to apples. Comparison of the breadth of a biotechnology patent claim to the breadth of a mechanical patent claim is less meaningful than comparing the breadth of one software claim to another software claim. Comparison across different technology spaces may cause the commonness of a given word to have vastly different impacts on overall claim breadth scores. For example, "encryption" might be found regularly in information technology patent claims and would only have a small negative impact on claim breadth, but that same word in a biotechnology claim may be relatively uncommon and represent a more significant limitation to claim breadth. Because the documents, or document portions, are given breadth scores with respect to the other documents in the same corpus those breadth scores may be ordered to produce a ranking with, e.g., 100 being the broadest (or alternatively the narrowest).

The user interface (UI) 118 may display, or otherwise present to a user, the breadth scores, the ranking, and an identifier for each of the analyzed documents. The UI 118 may also include additional information about a family of documents, a group of documents belonging to the same assignee, or other information. The identifier for each of the documents may be a unique identifier such as a patent number, a published patent application number, an international standard book number (ISBN), a title, a universal resource identifier (URI), etc. The UI 118 may be generated by processing a text file or other textual output. The UI 118 may be implemented as a command line interface, as a graphical user interface, or as another type of interface. When implemented as a graphical user interface, the UI 118 may be generated by a cloud service that is accessible over a communications network such as the Internet. Cloud services do not require end user knowledge of the physical location or configuration of the system that delivers the services. Common names associated with cloud services include "software as a service" or "SaaS", "platform computer", "on-dash demand computing," and so on. Any number of users may access the UI 118 any time through specialized applications or through browsers (e.g., Internet Explorer®, Firefox®, Safari®, Google Chrome®, etc.) resident on their local computing devices.

FIG. 2 shows one implementation of the UI 118 in more detail. The UI 118 may display information generated by the analysis pipeline 100 for a number of different documents or document portions. In this example the documents are issued patents and the analyzed portions are independent claims. However, the same or similar UI could display analysis of different types of documents. One illustrative type of UI is a graphical user interface (GUI) as shown in FIG. 2. A GUI is a type of user interface that allows users to interact with electronic devices through graphical icons and visual indicators such as secondary notation, instead of text-based user interfaces, typed command labels or text navigation. Actions in the GUI may be performed through direct manipulation of the graphical elements using a pointing device such as a mouse, stylus, or finger.

There is an entry for one or more documents in the UI 118 and information about those documents. The information may include broadest claim number 200, patent number 202, breadth score of the broadest claim 204, ranking 206 of the document relative to other documents in the corpus, claim language of the broadest claim 208, and/or identification of any anomalies 210. The UI 118 may also include interactive elements 212 associated with each of the entries. A one of the interactive elements 212 may be activated in response to a command generated on an input device to select a one of the documents. Information about the analysis of the selected document may be saved to a separate file, placed in separate portion of memory, or added to a list for later access and/or analysis.

The breadth scores 204 may be viewed as arbitrary numbers that by themselves do not have inherent meaning, but the difference in breadth score can be used to generate the ranking 206 and is an indication of the amount of variation between the breadth 204 of various patent claims or other document portions. In this example the broadest claim has a breadth score 204 of 85 and the ranking 206 of that claim is 1. One column in this UI 118 may display the claim language 208 of the broadest claim for the analyzed document. In some implementations in order to use less screen space such as on a mobile device, the column containing claim language 208 may display only a portion of the claim language or may present an operable UI element that, when activated, causes displays of the full claim language. Those claims for which anomalies were detected may be indicated by entries in the anomalies 210 column. In one implementation, the presence of any anomaly may be marked by a symbol or indicia. This indication itself may be an operable UI element that, when activated, causes display of the specific type of anomaly detected. In the implementation shown by this example UI 118, the anomalies 210 column provides a brief description of the anomaly or anomalies detected in a claim.

Illustrative Methods

The methods are illustrated as a collection of blocks in a logical flow graph representing a sequence of operations that can be implemented in hardware, software, firmware, or a combination thereof. The order in which the method blocks are described and claimed is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Methods 300-700 are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

Figure 3:
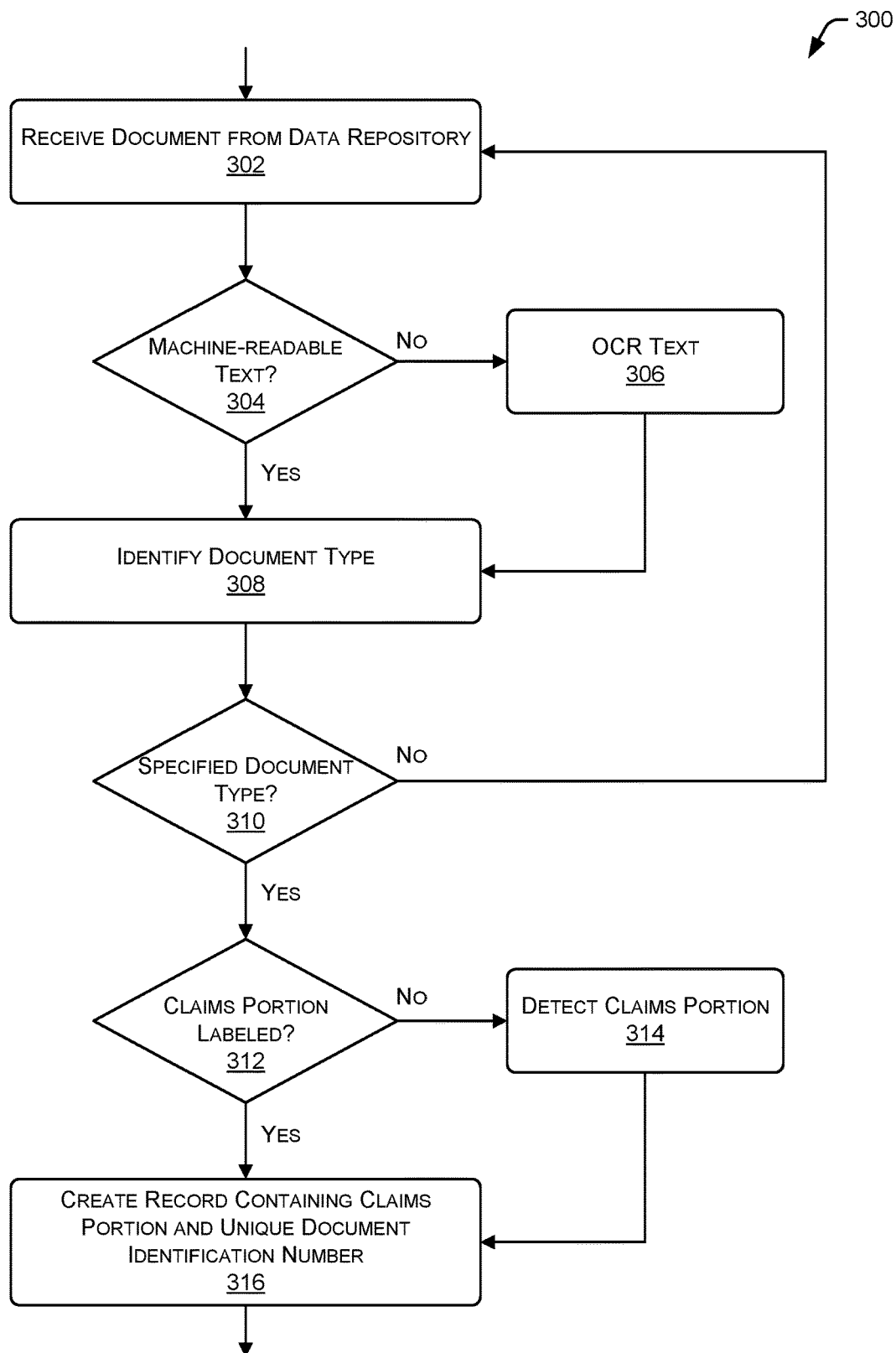
FIG. 3 is a flowchart showing an example method for filtering documents from a data repository to identify and prepare portions of those documents for analysis.

FIG. 3 is a flowchart depicting an example method 300 of filtering data that comes from one or more data repositories. For instance, a collection of patents and/or applications may be gathered from a data repository limited to a technology area. This allows the words and/or phrases to share a common ontology, vocabulary and/or taxonomy. In one implementation, the collection may be obtained based on classification codes, such as the U.S. Patent and Trademark Office (USPTO) classes and subclasses, or the International Patent Codes (IPC).

At 302, a single document may be received from a data repository for analysis. Each document in the data repository may be associated with a unique document identification number. The unique document identification number of a patent document may include an application number, a publication number, a patent number, and/or a combination of information associated with the patent document that may uniquely identify the patent document (such as a combination of a name of an inventor and a filing date, etc.).

This process may repeat until all documents in a targeted data repository are analyzed. The available data repositories may include, but are not limited to, a patent database provided and/or supported by a patent office of a particular country (e.g., a USPTO (United States Patent and Trademark Office) database, a PAIR (Patent Application Information Retrieval) database, EPO (European Patent Office) database, WIPO (World Intellectual Property Organization) database, SIPO (State Intellectual Property Office of the P.R.C.) database, etc.), and any other databases that are provided by public and/or private institutions over the world.

In some examples, the collection of patents that are gathered from the data repositories may be collected or gathered based on the jurisdiction and/or language that the patents are written in. For example, patent applications filed in China may be collected from data repositories. In some examples, the patent applications may be collected based on various characteristics, such as what technology area the patent applications are directed to, who the application or assignee of the patent application is, the type of patent application (e.g., utility model, invention patent, etc.), or any other type of characteristic.

At 304, it is determined if the document contains machine-readable text. Some types of files available from the data repositories such as HTML documents may already contain machine-readable text. Other types of files such as PDF files representing images of paper documents may lack machine-readable text. Draft documents or unpublished documents, for example, may be available only in forms that do not include machine-readable text. The determination of whether a document contains machine-readable text may be made in part by automatic detection of file type using known techniques for file type identification including recognition of filename suffixes. If a file type is not specified by a suffix or other metadata, it may be determined by opening the file and comparing the file structure to a library of known structures associated with known file types. If a document is determined to not include machine-readable text, method 300 may proceed to 306 and optical character recognition (OCR) may be used to recognize text in the document.

At 306, OCR may be applied to the document to convert the document into a format that contains machine-readable text. OCR is the mechanical or electronic conversion of images of typed, handwritten, or printed text into machine-encoded text, whether from a scanned document, a photo of a document, or other source. OCR is a method of digitizing from imaged texts so that they can be electronically edited, searched, stored more compactly, displayed on-line, and used in machine processes such as cognitive computing, machine translation, (extracted) text-to-speech, key data and text mining. OCR involves pattern recognition, artificial intelligence, and computer vision.

At 308, document type is identified. Document type means the type of information contained in a document rather than the computer file format in which the document is encoded. Documents may include identifying information such as unique document identification numbers, kind codes, and indications of source. Unique document identification numbers may, for example, include patent numbers that can be used to distinguish between different types of patents based on the structure of the number. For example when analyzing document identification numbers coming from a database of U.S. patents, a seven digit number may be interpreted as indicating that the document is a utility patent, and 11 digit number optionally with a "1" following the first four digits may indicate a published patent application, a five or six digit number preceded by the letter D indicates a design patent, and identifiers for plant patents begin with the letters PP. Kind codes in patent documents can also indicate if a document is a utility patent, plant patent, patent application publication, statutory invention registration, or design patent. The documents to be analyzed may come from any one of a number of different data repositories. If a given data repository is known to be limited to containing only documents of a certain type, then all documents obtained from that data repository may be assumed to be of the specified type. For example, a document obtained from a data repository that only contains academic papers on biotechnology may be identified as an academic paper on biotechnology by virtue of coming from this specific data repository. Each document at this point in method 300, will contain machine-readable text and be associated with a document type.

At 310, it is determined if the document is of one or more specified document types. This filters documents based on document type. Document type(s) may be specified by user.

In the absence of user specification, filtering may be performed based on a default document type. In one implementation, the default document type may be issued U.S. patents. Thus, any document that is identified as a U.S. patent either by a unique document identification number, a kind code, by coming from a particular data repository, or other technique is retained for further analysis. A user may also specify both issued U.S. patents and issued European patents in which case documents of either type would be determined to match the specified document type. However, if a document does not match the specified document type, method 300 returns to 302 and a new document is received from the data repository. This portion of method 300 may proceed automatically and continually until all documents within the one or more data repositories have been analyzed. This processing and filtering allows use of varied data repositories and allows for document analysis to be applied across multiple data repositories because there are mechanisms for converting all documents into machine-readable text and for excluding documents that do not match a specified document type.

For those documents that do match the specified document type at 310, method 300 proceeds to 312.

At 312, it is determined if the claims portion of the document is labeled. A labeled claims portion is identified as a portion of text that contains patent claims separate from other portions of a patent document. For example, a document in CSV format may have all the claims in the same column which is designated as containing claims. Alternatively, an HTML document may have specific tags on each claim indicating that is a claim and whether it is an independent or dependent claim. However, other documents such as an OCR version of a PDF document may simply contain undifferentiated text. For such documents, claims cannot be identified as such without additional analysis. This example discusses determining if a claims portion of a patent document is labeled. However, identifying specific label portions of a document is not limited to this application and may also be applied to determine of other portions of documents are separately identified such as determining which financial documents have executive summaries labeled as executive summaries.

If a document does not have a labeled claims portion, method 300 proceeds to 314.

At 314, the claims portion is detected. The specific technique for detecting claims portion may vary based on the document format. In one implementation, keyword recognition may be used to distinguish a claims portion. For example, if a page of a document includes the word "claim" or "claims" within the first line and is followed on that same page by a paragraph beginning with a number followed by a period, then that paragraph or entire page may be designated as a claims portion. Other recognition techniques may be alternatively or additionally applied. For example, any paragraph including a line ending with a semicolon may be interpreted as a claim.

At 316, a record is created from the document containing the claims portion and unique document identification number. This record may be stored as an independent file or as a portion of another file. The record may be in a different format than the format of the source document. In many implementations, the record will be stored in a memory that is both logically and physically separate from any of the data repositories. This record can be associated with the source document through the unique document identification number. The claims in the record may be distinguished as individual claims or may be an undifferentiated collection of text that represents some or all of the claims in the patent document. Thus, in the context of patent documents this record may represent the claims section of a patent document. Generation of multiple records from multiple documents can create a corpus of patent claims that are amenable for further analysis.

Figure 4:
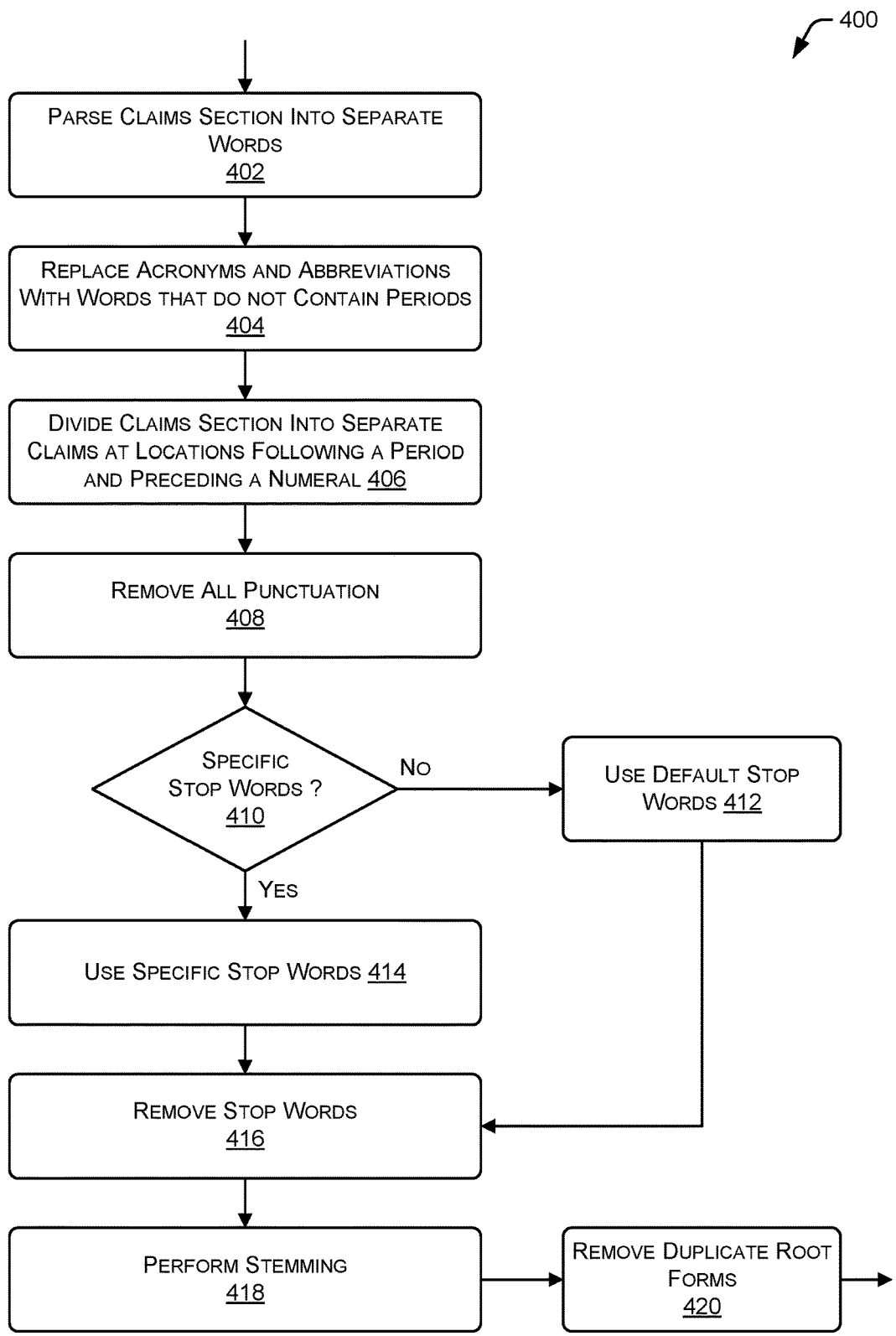
FIG. 4 is a flowchart showing an example method for pre-processing a portion of a document.

FIG. 4 is a flowchart depicting an example method 400 of pre-processing claims prior to an analysis of claim breadth. The pre-processing serves to normalize the content of the claims so that determination of claim breadth provides more consistent results. It also provides a way to customize part of the document analysis without modifying the techniques for determining claim scope.

At 402, the claims section of a document may be parsed into separate words. This divides the text of the claims section into multiple discrete words. Word parsing may be performed by identifying word delimiters and using the word delimiters to separate the text into individual words. A delimiter is a blank space, comma, or other character or symbol that indicates the beginning or end of a character string, word, or data item. In one implementation, the word delimiters are both a <space> and dash "-". Word parsing may be performed before after individual claims are distinguish from one another.

At 404, acronyms and abbreviations are replaced with alternative standardized representations. This may be performed by comparing each word from the claim section to a synonym library (e.g., a lookup table) containing known acronyms and abbreviations that are paired with alternative representations. In some implementations, the alternative representations may be fully written out words. Alternative representation may also be a standardized form that does not use periods. For example, "NASA" may be replaced with National Air and Space Administration. Similarly, "U.S.A." may be replaced by "USA" or in some implementations "United States of America." This serves to remove the periods that are found in some abbreviations and to normalize word count so that claims are not perceived as shorter merely because they use more acronyms or abbreviations. Removing periods in acronyms allows for use of the end of sentence period to be an indicator of where a first claim and a second claim begins.

At 406, the claims section may be to be divided into individual claims. Recall that after document filtering, each record of a document may include a claim section that could potentially contain multiple claims which are not separately differentiated from each other. Although it may be relatively trivial for a human to identify different claims in a document, it can be much more difficult for an automated process to accurately parse strings of text into separate claims. With patent claims, however, this may be done by creating separation between a first claim and a second claim whenever there is a period followed by a numeral. The separation may be implemented by inserting a carriage return, line break, or other marker. This is a reasonable approximation for dividing claims because once the abbreviations with periods have been replaced with full words, the only periods present in a set of claims will be at the end of a claim. Furthermore, each claim will start with a numeral such as a number from 1-20. Therefore, any point following a period and preceding a numeral is likely a division between two claims.

At 408, once the claims have been divided into separate claims, all punctuation may be removed. Punctuation may be removed by matching against a list of punctuation and deleting any character found in the list. Removing punctuation may remove any or all of periods, semicolons, commas, hyphens, brackets, slashes, and the like. Punctuation is generally understood to not affect claim breadth. Thus, by removing punctuation, characters that will not be processed further are taken out of the text which is to be analyzed.

At 410, it is determined if there are specific stop words. Specific stop words may be based on the content of the documents being analyzed. For example, if the documents are patent documents then the specific stop words may include words that are common in patent claims and unlikely to serve to distinguish one claim from another. A patent-specific list of stop words may include words and/or phrases such as "computer readable media," "system," "machine," "comprising," and "wherein," as well as words and/or phrases that indicate statutory classes such as "method," "article of manufacture", and "composition of matter." Technology specific stop words may also be used. For example, if all the patent documents being analyzed are from a same technological class or grouping, then stop words previously identified for that technology may be used. For example, "circuit" may be included in a stop list that is specific for documents describing electrical engineering. In some examples, depending on the particular collection of patents, different stop words may be utilized. For example, if the collection patents are written in Chinese, then stop words written in the Chinese language may be used. Further, if the collection of patents are utility model patents, then different stop words may be used than if the collection of patents are invention patents.

In some examples, depending on the type of natural language, different stop word listings may be stored. For example, different stop words may depend on a language of the jurisdiction in which the claims are filed. For instance, a first listing of stop words may be used when the jurisdiction is the United States of America, and a second listing of stop words may be used when the jurisdiction is China.

If specific stop words are not available, then method 400 proceeds to 412 and uses default stop words. If, however, specific stop words are available, then method 400 proceeds to 414 and uses the specific stop words. Multiple sets of stop words may be used together. For example one or more specific stop word lists may be used in conjunction with a default stop word list.

At 416, stop words are removed. If multiple stop word lists are used together, then words are removed if they appear in any of the stop word lists.

At 418, stemming is performed on the remaining words. Stemming is the process of reducing inflected (or sometimes derived) words to their word stem, base or root form—generally a written word form. The stem need not be identical to the morphological root of the word; it is usually sufficient that related words map to the same stem, even if this stem is not in itself a valid root. Stemming is an additional form of normalization that removes differences between similar words such as "compare" and "comparing." There are numerous known techniques for stemming including use of a lookup table, suffix stripping, Lemmatisation, stochastic algorithms, n-gram analysis, matching algorithms, etc. In one implementation, the Porter Stemmer algorithm from the publicly available "nltk" package is used to perform stemming.

At 420, duplicate words may be removed. When duplicate word removal occurs after stemming, it is actually the duplicate root forms of the words that are removed. For example, removable of duplicates prior to stemming would leave both "adapter" and "adapted" in the text of a process claim, but following stemming the words may both be converted to the root form "adapt" and one may be removed.

Thus, the various claim sections obtained from patent documents are standardized through pre-processing by replacing acronyms and abbreviations with alternative representations (e.g., writing out in full words), removing punctuation, removing stop words, stemming, and deletion of duplicate words. This pre-processing makes the data from the data repositories more amenable to automatic analysis of claim breadth. It also strips away some of the variation that may be introduced by various patent claim drafting techniques in an effort to approximate the content of a patent claim separate from a particular writing style. Although a human analyst can identify when writing is "wordy," automatic analysis of breadth may be confounded by different writing styles and potentially score similar claims differently unless pre-processing is performed.

Figure 5:
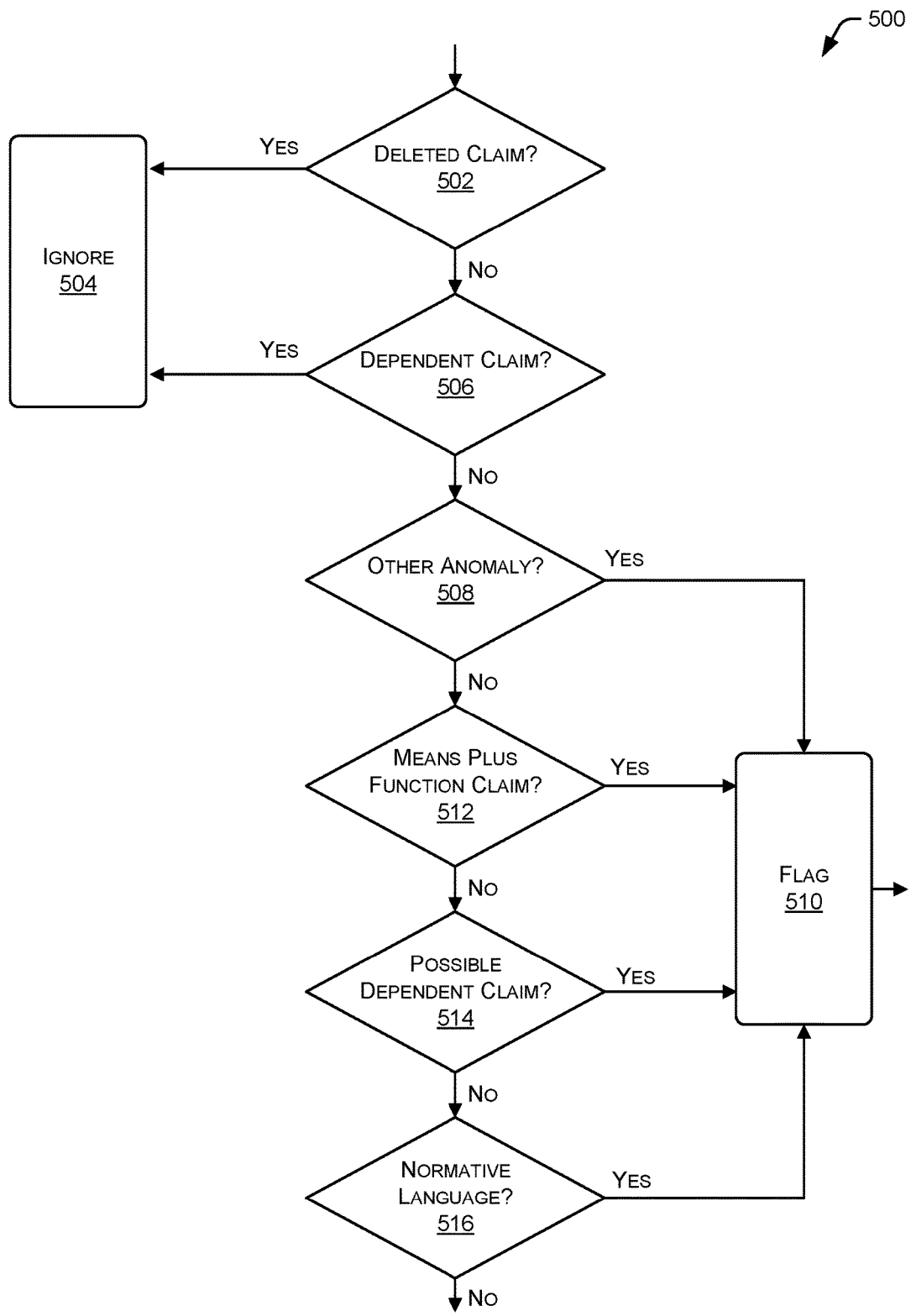
FIG. 5 is a flowchart showing an example method for determining if a portion of a document is ignored and excluded from further processing or flagged for manual review.

FIG. 5 is a flowchart depicting an example method 500 of identifying and processing claims having an anomaly. Given that automatic document analysis is not yet as effective as manual, human analysis, there may be some claim sections that proceed through document filtering and pre-processing yet are not appropriate for further analysis of claim breadth. These claims should be ignored. Additionally, even when filtering and pre-processing work as desired, there may be some characteristics of patent claims that are not properly analyzed by the techniques for automatically determining claim breadth. Rather than simply ignore these anomalies, they may be flagged or otherwise noted so that human users can evaluate the actual claim language.

At 502, it is determined if a section of a document marked as a claim contains a deleted claim. If so, method 500 proceeds to 504 and ignores the deleted claim so that is not considered in further analysis. Any document section marked having one of the following characteristics may be designated a deleted claim:

Contains any of the words ". (canceled)", "remove", "delete", "delete.", or "deleted"

Is less than 10 characters

If a document section is not characterized as a deleted claim, method 500 proceeds to 506.

At 506, it is determined if a section of a document marked as a claim contains a dependent claim. Because dependent claims necessarily narrow the scope of an independent claim, if method 500 is implemented to identify and determine the claim breadth for a broadest claim in a given patent document, dependent claims can be ignored. Thus, for any claim found to be a dependent claim, method 500 proceeds to 504 and ignores that claim. A document section containing a claim that has any of the following words or phrases may be designated as a dependent claim:

"claim" followed by number
"claim" followed by roman numeral
"according to" followed by number
"method" followed by number
"system" followed by number
"of wherein"
"step" followed by number
"according" followed by number
"claim to" followed by number
"recited" followed by number
"recited in" followed by number
"set forth in" followed by number
"article of <something>" followed by number
"article of <something something>" followed by number
"method of <something>" followed by number
"method of <something something>" followed by number
"claim of" followed by number
"clam" followed by number "clan" followed by number
"claims" followed by number
"claimer" followed by number
"claim" followed by letter/number
"claim" followed by letter/number <comma>
"claim"<space><comma>
"claim"<nospace><number>
<space>"claim"<period>
"according to claim"
starts with "The" instead of "A" or "An"
"of number"<comma>"wherein"

If a document section is not characterized as a dependent claim, method 500 proceeds to 508.

At 508, it is determined if a claim has some other type of anomaly. If so, the claim is not ignored or deleted, but rather method 500 proceeds to 510 and the claim is flagged so that it can be looked at manually. The flag attached to a claim may indicate the type of abnormality detected or there may simply be an indicia showing that that an abnormality was detected. The specific type of abnormality will likely be self-evident upon manual review of the claim by a human. A claim may be designated as having some other type of anomaly if it has any of the following characteristics:
  empty string
  claim starts with a number
  starts with lowercase "a"
  starts with other lowercase letter During automatic analysis once a claim is flagged as having any type of anomaly, further anomaly detection stops. For example, claims are determined to be dependent claims are not additionally analyzed to determine if they contain means plus function language. This sequential processing technique saves processing power by not analyzing every claim for every potential type of abnormality. This also increases the speed at which documents are automatically analyzed because there are fewer processing loops. If, at 508, a claim does not have any other anomalies, method 500 proceeds to 512.

At 512, it is determined if the claim is a means plus function claim. Means plus function claim are recognized by the presence of a <space> followed directly by "means" in the language of the claim. Claims identified as means plus function claims are flagged because the scope of such claims is based on definitions provided in the specification of the patent document so a determination of claim breadth based on word count and word frequency and the claim may be an inaccurate representation of the true claim breadth. If the claim is a means plus function claim, method 500 proceeds to 510 and the claim is flagged. However, if not, method 500 proceeds to 514.

At 510, other types of claims may be flagged based on substantive law associated with the particular jurisdiction in which the claims are filed. For example, in some jurisdictions (e.g., India) certain types of claims may not be allowed, such as computer-readable media claims. Accordingly, if language associated with computer-readable media is identified in claims filed in India, those claims may be flagged at 510, and/or have their associated claim breadth scores lowered based on detecting language that is not allowable in a particular jurisdiction.

At 514, it is determined if a claim is a possible dependent claim. A possible dependent claim is a claim that may be dependent but the automatic analysis is not confident enough to mark the claim as "dependent" and ignore it for the purposes of further analysis. Therefore, the claim is flagged so that it may be manually reviewed and determined if it is in fact a dependent claim and should be ignored. A claim having any of the following characteristics may be designated as a possibly dependent claim:
  <number><comma>"wherein"
  contains a number anywhere within If a claim does not have any of the above characteristics, method 500 proceeds to 516.

At 516, it is determined if a claim contains normative language. Normative language in a claim is language that indicates a statement about how things should or ought to be as opposed to merely descriptive language. The presence of normative language may confound techniques for automatically determining claim scope because normative language has the potential to indicate features in the claim which are not truly limiting of the claim breadth. Presence of any of the following words or phrases in a claim may suggest normative language:
  "must not"
  "required"
  "shall not"
  "shall"
  "could not"
  "cannot"
  "ought not"
  "ought"
  "has to"

If a claim contains normative language, method 500 proceeds to 510 and flags the claim. However, if a claim does not include normative language, the claim is not flagged and any result from subsequent analysis is presented to a user without a flag or other indicia of abnormality. Any claim flagged at 510 also proceeds to further analysis, but the results of the analysis of that claim are associated with a flag and/or a description of the abnormality. One example of this flag or description is the anomalies 210 column of user interface 118.

In an implementation, a patent claim or other document portion may be evaluated for anomalies by detection of each of the potential anomalous features described above. Thus, for example, rather than identifying a claim as being a dependent claim and then ceasing further analysis, their dependent claim may be further analyzed to determine if it is a mean-plus-function claim, contains normative language, or has another type of anomaly. A claim or other document portion may be analyzed to determine if it is a deleted claim at 502 to determine if it is a dependent claim at 506, to determine if there any other anomalies present at 508, to determine if it is a means-plus-function claim at 512, to determine if it is a possible dependent claim at 514, and also to determine if it contains normative language at 516.

Figure 6:
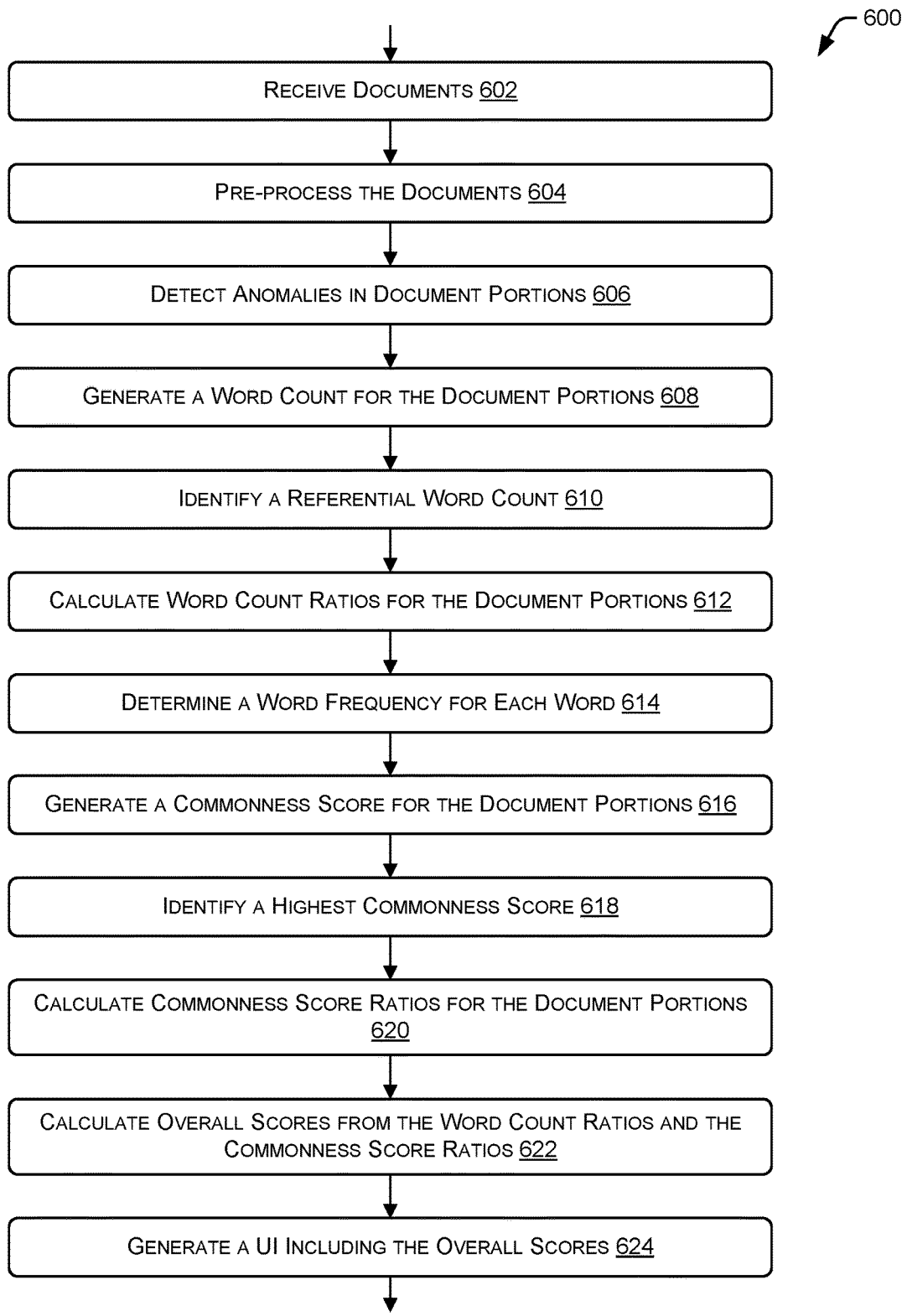
FIG. 6 is a flowchart showing an example method for automatic processing of documents to generate a user interface.

FIG. 6 is a flowchart depicting an example method 600 of automatically processing documents to generate a UI that shows overall breadth scores for the documents. Portions of method 600 may be the same or similar to portions of methods 300-500 described above.

At 602, a plurality of documents is received. The documents contain text either in computer-readable form or otherwise and each document is associated with a unique document identification number. This unique document identification number may be used to label the document as well as any sub-portions of the document. For some documents, specifically patent documents, the unique document identification number may be a patent number or a patent application publication number. The plurality of documents may be received from one or more data repositories such as the data repositories 102 show in FIG. 1. The received documents may be stored locally in a memory device separate from the data repository that provided the documents.

At 604, the plurality of documents are pre-processed to generate one or more processed document portions for each of the plurality of documents. The pre-processing may use all or part of the method described in FIG. 4. Thus, a processed document or a processed document portion refers to the document or portion thereof following pre-processing. In some implementations, the pre-processing itself may divide a document into two or more processed document portions. For example, when analyzing text containing patent claims, the document may be divided into document portions (e.g., individual patent claims) at locations following a period and preceding a numeral. Each portion of the document is associated with the unique document identification number of the source document. For example, each patent claim from a patent would be associated with the patent number. The processed document portions include a portion of the text from the source document. The specific pre-processing techniques may include parsing text to separate words, removing stop words, removing duplicate words, and removing punctuation. Some or all of the stop words may be specific to a document classification of the plurality of documents. For example, if all of the plurality of documents are associated with the same patent classification, and there are specific stop words for that classification, then those specific stop words may be used instead of or in addition to general stop words. In some implementations, pre-processing may include additional pre-processing techniques such as replacing abbreviations and/or acronyms with the corresponding full words.

At 606, anomalies are detected in the document portions. The detection of anomalies may proceed according to a method that is the same or similar to method 500 shown in FIG. 5. Many anomalies may be detected based on anomalous words or phrases that are characterized as suggesting the presence of an anomaly. One type of anomaly is the presence of normative language, and this may be detected by the presence of normative words in a document portion.

One result of anomaly detection may be excluding the processed document portion from further analysis. Certain anomalies may indicate that the processed document portion is not suitable for further analysis. Assumptions made in the design of the subsequent analysis may cause inaccuracy or irrelevant results if the analysis is applied to document portions with certain types of anomalies.

Another result of anomaly detection is flagging the processed document portions that are determined to have an anomaly. Further analysis may proceed in the same way for flagged document portions as well as for unflagged document portions. But the flag or other indicia of an anomaly allows a human to review the analyzed document portion and determine how, if at all, to account for the anomaly.

At 608, a word count is generated for each of the processed document portions by counting a number of separate words in the respective document portions. This may be performed after pre-processing so that stop words and duplicate words are omitted from the count. A word count performed after removal of duplicate words is referred to as a word count of unique words. Each document portion (e.g., patent claim) is associated with a word count which is an integer.

In some examples, the word count at 608 may be generated differently for different jurisdictions. For example, the substantive law may vary for certain jurisdictions. As an example, some jurisdictions (e.g., United States of America) may not give patentable weight, or may give less weight, to words in a preamble of a claim. Accordingly, the word count may not include words in the preamble of the claims for patents filed in the USA. Conversely, other jurisdictions (e.g., China) may give patentable weight to words in the preamble of claims, and thus the word count for claims filed in China may be included in the word count generated at 608.

At 610, a referential word count is identified. The referential word count is a number but not necessarily an integer. The referential word count is based on a characteristic derived from the word counts of the individual document portions under analysis. The referential word count may be the word count of the document portion having a largest word count out of all the analyzed document portions. Alternatively, the referential word count may be the word count of the document portion having a shortest word count out of all the analyzed document portions. Other characteristics may also be used to generate the referential word count such as the average or median word count of the analyzed document portions. For example, if the analyzed document portions are patent claims, then the referential word count may be the word count of the longest patent claim, the word count of the shortest patent claim, the average word count of all the analyzed patent claims, the median word count of all the analyzed patent claims, or some other metric. The referential word count is the same for all document portions analyzed together in the same corpus. However, due to the different characteristics of each corpus of documents analyzed, the referential word count will be different in different analyses.

At 612, word count ratios are calculated for the document portions. A word count ratio is the referential word count divided by the word count for a particular document portion. Thus, each analyzed document portion will be associated with a word count ratio. The numerator is the same for each document portion in a given corpus but the denominator is different depending on the individual word count of that document portion. For example, if the word count for a given document portion is 25 and the referential word count is 72 (e.g., the longest word count of all the analyzed document portions) then the word count ratio for that particular document portion is 72/25 or 2.88.

At 614, a corpus-based word frequency is determined for each word included in any of the document portions. Word frequency is specific to the word not the document portion in which the word is found. Word frequency may be thought of as a measure of how common a particular word is throughout all of the analyzed document portions. Word frequency is determined by counting how many times a word appears in all of the analyzed document portions. Thus, word frequency represents the number of instances that a word is found across the entire set of content under analysis prior to removal of duplicate words. For example, if the corpus of documents being analyzed includes 1000 patents, those patents each have on average 20 patent claims, then there will be 20,000 document portions under analysis. The number of times a given word such as "machine" appears throughout all 20,000 document portions is that word's frequency. Words that are common in a particular corpus will have higher word frequency values and words that are uncommon in the particular corpus will have lower word frequency values. Thus, at this point each document portion is associated with a word count and each word (which necessarily includes the words in each document portion) is associated with a word frequency.

At 616, a commonness score is generated for the processed document portions. Each document portion may be associated with its own commonness score. The commonness score is based on the frequency that the individual words in a particular document portion are found throughout the entire corpus of document portions under analysis. Thus, the commonness score for a document portion is based on the word frequencies of the words in that document portion. In one implementation, the commonness score for a processed document portion is based on the square root of the sum of the squares of the inverse of the word frequency for each one of the separate words in that processed document portion. Thus, the commonness score (cs) for document portion having words 1 to n each with an associated word frequency represented by $wf^1$ to $wf^n$ may be calculated by the following equation:

$$commonness\ score = \sqrt{\left(\left(\frac{1}{wf^1}\right)^2 + \left(\frac{1}{wf^2}\right)^2 + \ldots + \left(\frac{1}{wf^n}\right)^2\right) \times 100} \quad (1)$$

With this calculation a document portion that has more common words will receive a lower commonness score and a document portion that has more uncommon words will receive a higher commonness score. In this manner, commonness score represents an underlying assumption or premise that patent claims with more common words tend to be broader than claims with less common words. This may not always be the case, but is a useful generalization for automatic document analysis.

At 618, the highest commonness score is identified out of all of the processed document portions undergoing analysis. The commonness scores for each of the document portions may be calculated, sorted, and then the highest of those is stored as the highest commonness score. This represents the score of the document portion that is the "most common" based on the frequency and number of words included in that document portion. Thus, every other document portion will have a commonness score that is lower than the highest commonness score.

At 620, commonness score ratios are calculated for all of the processed document portions. Commonness score ratios are calculated by dividing the highest commonness score by the commonness score for individual ones of the processed document portions. Thus, the document portion with the highest commonness score (the "most uncommon" words) has a commonness score ratio of 1 (i.e., it is divided by its own commonness score value). While, a document portion with half the highest commonness score (fewer "uncommon" words and more "common" words) has a commonness score ratio of 2. As the set of words in a document portion become more "common" the commonness score ratio increase. Thus, a higher commonness score ratio indicates more "common" or frequent words in a processed document portion. In the context of patent claims, commonness ratio represents an underlying assumption or premise that claims with fewer unique words tend to be broader than claims with more unique words, and thus, the commonness score ratio increases as the words in claim become more common.

At 622, overall scores are calculated from the word count ratios and the commonness score ratios. The overall scores may be calculated by taking a square root of the sum of the square of the word count ratio (wcr) and the square of the commonness score ratio (csr) for the individual ones of the processed document portions. The relative weights of the word count ratio and the commonness score may be normalized. One technique for normalization is to set the highest respective values for both word count ratio and commonness score ratio to 100. If, for example, the highest word count ratio is h-wcr, then all of the wcr for the corpus will be multiplied by 100/h-wcr. Similar normalization may be performed for the commonness score ratio using the highest commonness score ratio (h-csr). Of course normalization values other than 100 may be used such as 1000, 500, 50, 10, etc. Both are numbers but the relative effect on an overall score (e.g., claim breadth) may not directly correspond to the respective numerical values. For example, a word count ratio of 10 may have more or less impact on ultimate breadth than a commonness score ratio of 10. However, without normalization both contribute equally to the overall score. Thus, the word count ratio may be weighted by a first normalization value K (e.g. 100/h-wcr) and the commonness score ratio may be weighted by a second normalization value L (e.g., 100/h-csr). When written in an equation:

$$Overall\ Score = \sqrt{K(wcr^2) + L(csr^2)} \quad (2)$$

Thus, each document portion may be assigned its own overall score. The overall scores may be thought of as measuring the breadth of the document portions because the overall scores are based on measures of word count and word commonness. This technique for determining an overall score also moderates each of the underlying assumptions or premises behind the word count ratio and the commonness ratio. For example, if a patent claim is relatively shorter, but uses very uncommon terms, a patent practitioner might still consider the claim to be narrow due to the restrictive language in the claim. By defining overall score based on these two underlying assumptions, even shorter claims may be ranked not quite as broad if they use terms that are considered limiting or distinctive within a class in which an ontology is well developed.

If a document has multiple document portions that are analyzed, such as a patent document having multiple independent claims, the document may be assigned a single overall score based on the overall scores of one or more of the document portions. The overall score attributed to the document may be the highest, the lowest, the average, or the median, of the respective overall scores of the document portions. Assigning a single score to a document enables the system to rank order, for example, patent documents relative to one another in terms of claim breadth.

Due to the processing efficiencies obtained by using automatic computer-based analysis, in some implementations the pre-processing at 604, the detecting of anomalies at 606, the generating of word counts at 608, the identifying referential word counts at 610, the calculating of word count ratios at 612, the determining of word frequencies at 614, the generating of commonness scores at 616, the identifying the highest commonness score at 618, the calculating of commonness score ratios at 620, and the calculating overall scores at 622 are performed at a rate much faster than can be achieved through human analysis. For example, this analysis may proceed at a rate of more than one document per minute, more than one document per 30 seconds, more than one document per 10 seconds, or another rate. This is a rate much faster than can be achieved by manual, human analysis. Although the subjective evaluation of an knowledgeable expert will likely provided a better measure of breadth (and also use a different less formulaic way of determining breadth than a computer) it will be much slower. The advantage in speed gained by an automated process is countered by a loss in accuracy. Therefore, one way of comparing various automatic techniques for document analysis is by identifying which technique best emulates the analytical results achieved by manual analysis.

In some examples, some or all of 602-622 may be performed on documents written in different natural languages. For example, the various steps or algorithms may be tailored to be performed in a specific natural language (e.g., English), and the documents received at 602 may be translated from a language in which the documents (e.g., patent applications) were written in (e.g., Chinese, Japanese, etc.) to the specific natural language that the steps were tailored for, and then the various steps 602-622 are performed on the translated documents. However, in some examples, the documents need not be translated into the specific natural language. For example, the techniques described herein contemplate that the words, characters, or other symbols included in the documents written in different natural languages may be represented in various ways such, as by using computer representations of the words, characters, or other symbols, such as Unicode strings, ASCII strings, or other strings. Rather than having to translate the documents, the various steps or algorithms may instead use the computer representations of the words, characters, or other symbols in the documents to perform the techniques described herein. For instance, the corpus of documents downloaded may all be written in the same foreign language. Rather than translating the documents to the specific natural language (e.g., English), the computer representations of the corpus of documents may be analyzed for the various steps 602-622. For instance, rather than looking through the corpus of documents for specific English words at 608, the techniques may count the computer representations (e.g., Unicode strings, ASCII strings, etc.) of the words included in the documents of the corpus of documents to identify the word count for the document portions. In this way, the techniques may improve upon existing techniques that require translations by requiring less computing power to perform the steps 602-622, while achieving the benefits of the steps 602-622 in differing natural languages.

In some examples, some or all of 602-622 may be performed on a corpus of documents written in multiple, different natural languages. For example, at 604, the preprocessing of the documents may include determining, for each document, in what natural language the document is written. Based on the type of language for each patent, numerical representations specific to that language may be determined for each word in the varying languages, and one or more of the steps of 606-624 may be performed for each document. In some examples, the scores determined in one or more of steps 608, 610, 612, 614, 616, 618, 620, and/or 622 may vary somewhat based on the type of language. For instance, it may be that a claim written in Chinese may comprise more words than the same claim written in English. In order to accurately rank and compare documents across different languages, trends or averages in word counts for each language may be determined, and scaling factors may be used to normalize word counts between varying languages. In this way, accurate scoring or ranking of documents, such as patents, may be determined across varying languages. In some examples, different scaling factors may be applied based on technology classifications for specific languages as well, or any other type of classification, to normalize the various scores determined in one or more of steps 608-622. In some examples, this may result in various efficiencies over human-analysis, such as by reducing errors between humans that speak different languages, and reducing or eliminating the subjectivity of humans.

At 624, a UI is generated that includes one or more of the overall scores. The UI may be generated such that an overall score for one of the processed document portions is displayed in proximity to the unique document identification number associated with that processed document portion. For example, the overall score for an independent patent claim may be displayed next to the patent number. Additionally, generation of the UI may include generation of indicia indicating results from the detection of anomalies during detection of anomalies at 606. The indicia may be flags indicating that an anomaly was detected. Alternatively or additionally the indicia may be a description of the type of anomaly.

In an implementation, the UI may be a textual UI or a command-line interface that displays a line of text including the overall score, the unique document identification number, and the indicium of anomalies. In an implementation, the UI may be similar to the UI 118 shown in FIGS. 1 and 2. The UI may include information on only one processed document portion either to highlight a particular document (e.g., one having a highest overall score out of all the documents in the analyzed corpus), due to limitations of screen real estate such as on mobile devices, to minimize a volume of data transmitted across a network, or for other reasons. Alternatively the UI may display information on a one or all of the processed document portions. The UI may display information on a sub-set of the processed document portions that have a common secondary data field such as assignee. In some implementations, there may be a large number of overall scores, such as when thousands of document portions are analyzed, so the UI may include scrolling or other functionality that allows a display device to show different portions of the UI in response to user commands.

Figure 7:
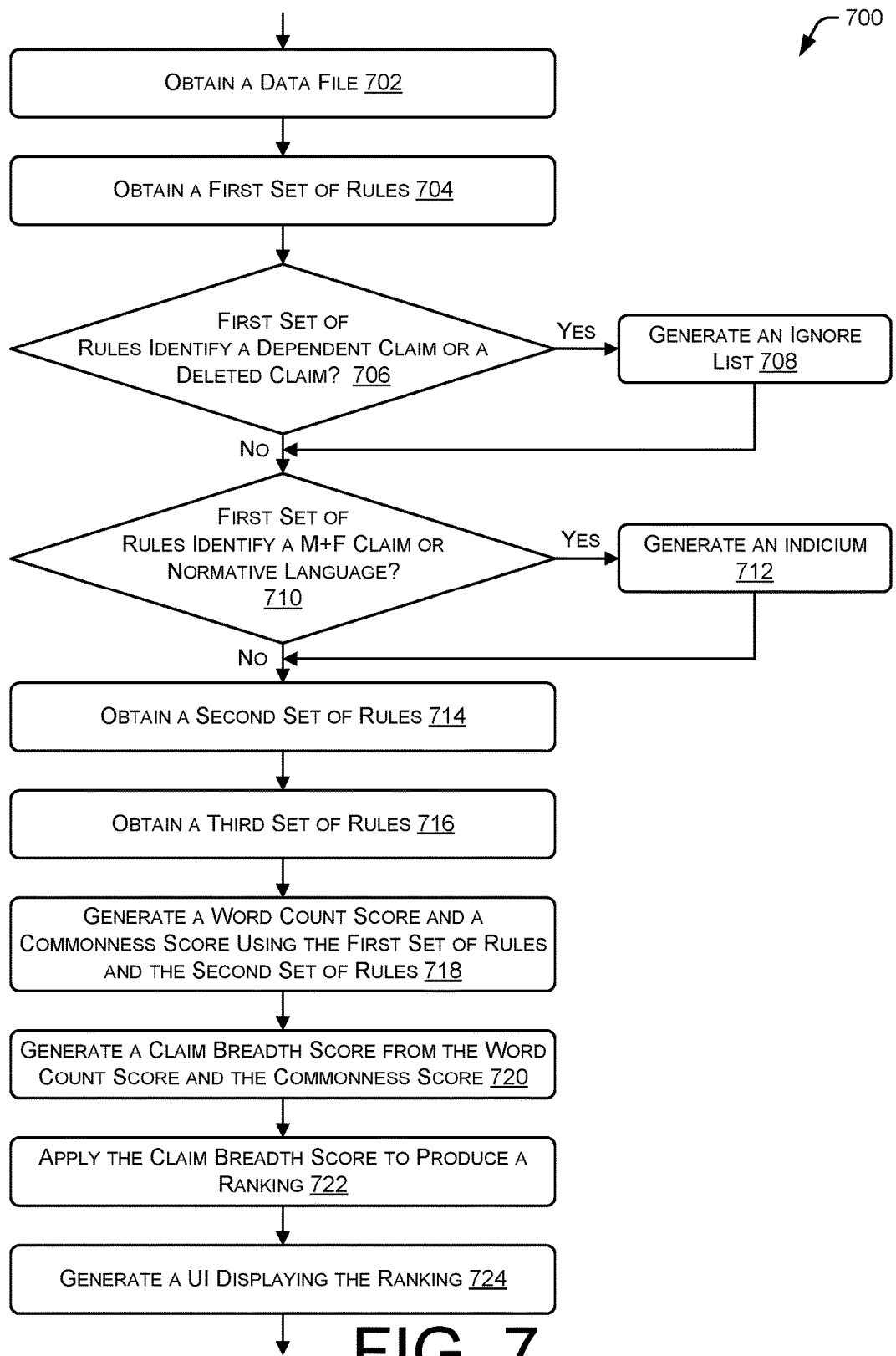
FIG. 7 is a flowchart showing an example method for automatically processing data files according to multiple sets of rules.

FIG. 7 is a flowchart depicting an example method 700 of automatically assigning a claim breadth score to a patent claim by applying multiple sets of rules. Portions of method 700 may be the same or similar to portions of methods 300-500 described above.

At 702, a data file is obtained. In an implementation, the data file may be obtained from one of the data repositories 102 show in FIG. 1. The data file may alternatively be obtained from local storage or another storage device besides one of the data repositories. The data file may include a corpus of patent claims and may be an issued patent or a published patent application.

At 704, a first set of rules is obtained. Obtaining the first set of rules may include loading the first set of rules into random-access memory (RAM). The first set of rules defines an anomalous patent claim. The anomalous patent claim may be a dependent patent claim, a deleted patent claim, a means-plus-function patent claim, or patent claim containing normative language. Anomalous patent claims may be identified using a technique that is the same or similar to method 500 shown in FIG. 5.

At 706, it is determined if the first set of rules identifies a dependent claim or a deleted claim. If so, when a patent claim is determined to be a dependent claim or a deleted claim, method 700 proceeds to 708 and generates an ignore list including that claim. Out of the corpus of patent claims, all pending claims identified as dependent or deleted may be included in the ignore list. In an implementation, further analysis such as generation of a word count score and commonness score is not performed for any claims included in the ignore list. This reduces unnecessary computations and makes the processing faster as compared to a technique that generates word count scores and/or a commonness scores only to later ignore those scores.

If, at 706, a claim is not identified as a dependent claim or a deleted claim by the first set of rules, then method 700 proceeds to 710.

At 710, it is determined if the first set of rules identifies a means-plus-function claim or a claim containing normative language. If the first of rules does so and a given claim is identified as either a means-plus-function claim or a claim containing normative language, then method 700 proceeds to 712 and generates an indicium of abnormality. The indicium of abnormality may be a flag stored in a data file associated with a given patent claim. The flag may be used to generate an indicium of abnormality that is displayed on a UI, such as the anomalies 210 shown in FIG. 2.

Each claim obtained from the data file at 702 is analyzed according to the first set of rules and either ignored, associated with an indicium of abnormality and retained for further analysis, or neither but only retained for further analysis.

At 714, a second set of rules are obtained. Obtaining the second set of rules may include loading the second set of rules into RAM. The second set of rules defines a word count score for a patent claim as a function of a word count in the patent claim. In one implementation, the second set of rules may include a second rule defining the word count score as based on a number of words in the patent claim following pre-processing. The pre-processing may be the same or similar to the pre-processing shown in FIG. 4. The pre-processing may include any of stemming, removal of duplicate words, removal of stop words, as well as other processing techniques.

In an implementation, the word count score may be determined by a ratio of a number of words in a high-word count patent claim to a number of words in the patent claim being analyzed. The high-word count patent claim is the one claim out of the corpus of patent claims under analysis that has the largest number of words following the pre-processing. The word count of the patent claim being analyzed is the number of words in that claim following pre-processing. If pre-processing includes removal of duplicate words, then the word counts are counts of unique words.

At 716, a third set of rules are obtained. Obtaining the third set of rules may include loading the third set of rules into RAM. The third set of rules define a commonness score for the patent claim as a function of the frequency with which words in that patent claim are present in the corpus of all patent claims under analysis. The third set of rules may include a third rule defining the commonness score as based on a per-claim commonness score. The per-claim commonness score may be calculated by a square root of a sum of, for each word in the patent claim following pre-processing, the square of the inverse of a global word count for each word. In an implementation, the second rule may define the commonness score according to equation 1 above. The global word count represents a corpus-based count of the number of times that word appears in any patent claim within the corpus under analysis. The global word count may be based on word counts prior to removal of duplicate words during pre-processing. The global word count may be performed for stop words as well. However, reduction of time and associated computation costs may be achieved by removing stop words prior to calculating global word counts for the remaining words.

In an implementation, the commonness score may be a ratio of the per-claim commonness score of a high-commonality patent claim to the per-claim commonness score of the patent claim being analyzed. The high-commonality patent claim is the patent claim in the corpus of patent claims with the largest per-claim commonness score. This representation of commonness score considers not just the word count in the individual claim and other claims but also considers how the "commonness" of words in a given patent claim compare with the "commonness" of other patent claims in the same corpus.

At 718, a word count score and a commonness score are generated using the second and third set of rules. The second and the third set of rules may be applied to all of the patent claims in the corpus under analysis to obtain word count scores and commonness scores for each of those patent claims. This creates new data resulting from application of the second and the third set of rules. This new data may be stored in association with the corresponding patent claims. Thus, for example patent claim 1 from patent number 8,000,000 may be associated with a first integer representing word count score and a second floating-point number representing a commonness score.

At 720, a claim breadth score is generated from the word count score and the commonness score. The claim breadth score may be calculated by square root of the sum of both the square of the word count score and the square of the commonness score. The relative impact of the word count score and of the commonness score may be modified by weighting the raw score values to create weighted scores. This may be repeated for each patent claim under analysis so that each patent claim is now associated with a new piece of data representing an associated claim breadth score. In an implementation, the claim breadth score may be generated by equation 2 above.

In some examples, the claim breadth score may further be generated at 720 based on substantive law associated with the jurisdiction in which the claims are filed.

At 722, the claim breadth score is applied to produce a ranking result. Given that each patent claim is associated with a claim breadth score, the values of those scores may be used to produce a ranking of the patent claims in a corpus. The ranking may be implemented by creating a sorted list from the values of the claim breadth scores. In some implementations, the data may be placed in an array, allowing for random access, rather than in a sorted list. Example sorting algorithms that may be used include merge sort, heapsort, binary tree sort, block sort, odd-even sort, and the like.

In 724, a UI is generated displaying the ranking generated at 722. The ranking shows the claim breadth score of the patent claim under analysis. The UI may also display other claim breadth scores of other patent claims from the same corpus. Additionally, the UI may display patent numbers associated with one or more of the individual patent claims. In some implementations, the UI may be the same or similar to the UI 118 shown in FIGS. 1 and 2. The UI may also be a command-line interface that shows the breadth scores, rankings, and any associated patent or application numbers as one or more lines of text.

In some examples, one or more of the steps of method 700 described from 702-724 may be performed for different time in prosecution of a patent or a corpus of patent documents. For example, a claim breadth score may be determined for patents in a corpus at a first point in time, such as when the patents were filed, or before amendments were made to the claims (or any other point in prosecution). Additionally, the claim breadth scores may be determined for the patents at a second point in time, such as a point in time corresponding to when the claims were allowed (or any other time in prosecution). In various examples, a difference in claim breadth scores between the first point in prosecution and the second point prosecution may be determined, and an average change in patent claim breadth scores may be determined for individual patents, or for a corpus of patents. In some examples, the corpus of patents may be associated with a particular classification, such as a particular jurisdiction, a certain patent type (e.g., invention patent, utility model patent, utility patent, etc.), a certain assignee and/or application, a certain inventor, etc. In various examples, an average change in patent claim breadth scores may further be used to determine claim breadth scores for other patents. For example, an average change in patent breadth scores for invention patents assigned to a particular assignee or filed by a particular application may be applied to utility model patents for the same assignee or applicant. In this way, claim breadth scores may be determined for utility model patents with a certain degree of certainty based on corresponding, average changes in claim breadth scores for the same assignee or applicant.

Illustrative Computing Device(s)

Figure 8:
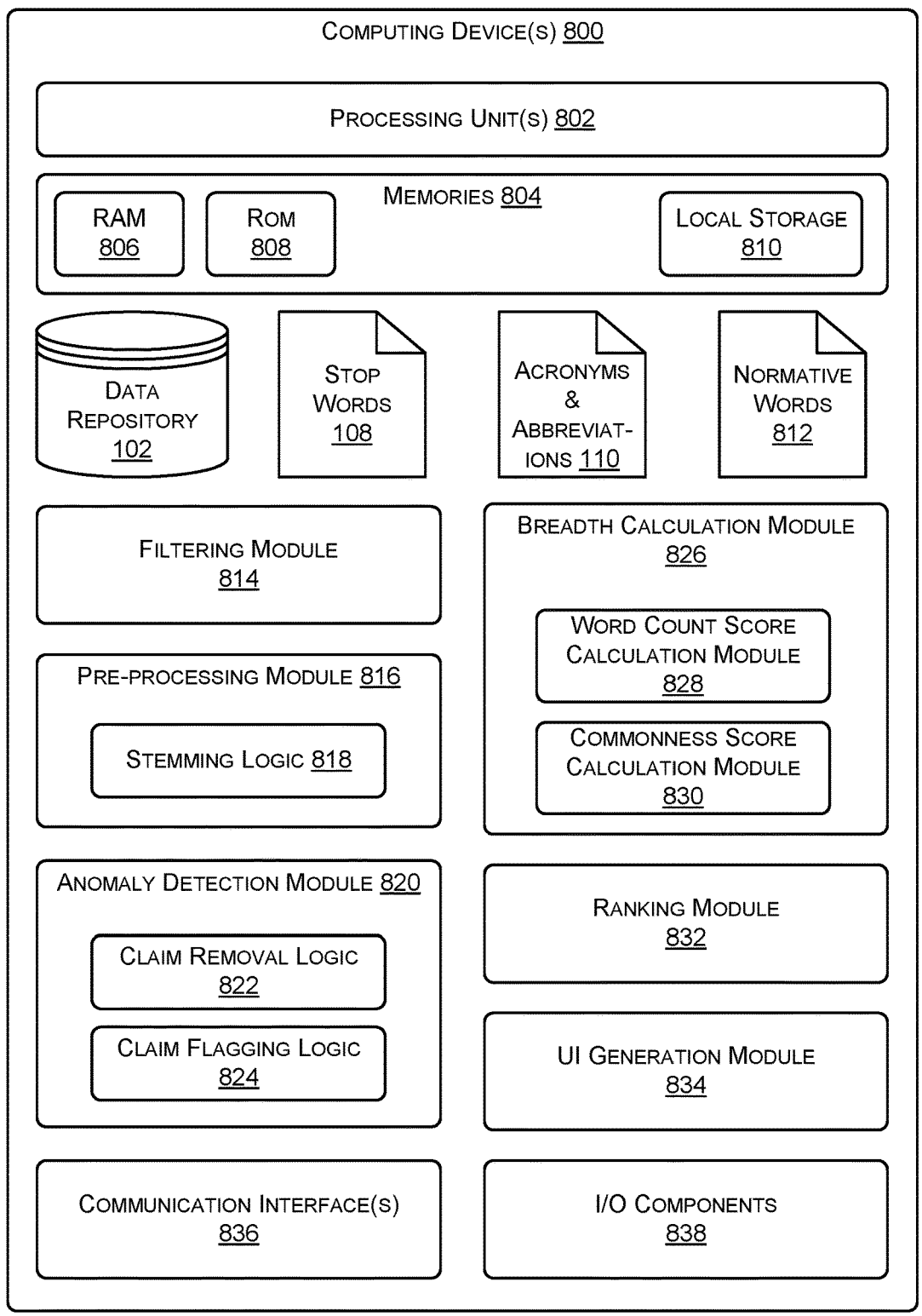
FIG. 8 shows a schematic diagram of one or more computing devices designed for automatic, human-emulative processing of documents.

FIG. 8 shows a schematic block diagram of an example computing device(s) 800. Examples of the computing device(s) 800 may include a server, a desktop PC (personal computer), a notebook or portable computer, a workstation, a mainframe computer, a handheld device, a netbook, an Internet appliance, a portable reading device, an electronic book reader device, a tablet or slate computer, a game console, a mobile device (e.g., a mobile phone, a personal digital assistant, a smart phone, etc.), or a combination thereof. The computing device(s) 800 may be implemented as a single device or as a combination of multiple physically distinct devices. For example, computing device(s) 800 may be implemented as a combination of a server and a client.

The computing device(s) 800 may include one or more processing units 802 and memories 804, both of which may be distributed across one or more physical or logical locations. The processing unit(s) 802 may include any combination of central processing units (CPUs), graphical processing units (GPUs), single core processors, multi-core processors, processor clusters, application-specific integrated circuits (ASICs), programmable circuits such as Field Programmable Gate Arrays (FPGA), Application-specific Standard Products (ASSPs), System-on-a-chip systems (SOCs), Complex Programmable Logic Devices (CPLDs), and the like. One or more of the processing unit(s) 802 may be implemented in software or firmware in addition to hardware implementations. Software or firmware implementations of the processing unit(s) 802 may include computer- or machine-executable instructions written in any suitable programming language to perform the various functions described. Software implementations of the processing unit(s) 802 may be stored in whole or part in the memories 804.

The memories 804 are representative of any number of forms of memory including both persistent and non-persistent memory. In one implementation, the memories 804 may include computer-readable media in the form of volatile memory, such as random access memory (RAM) 806 and/or non-volatile memory, such as read only memory (ROM) 808 or flash RAM. RAM 806 includes, but is not limited to, integrated circuits, phase change memory (PRAM), static random-access memory (SRAM), dynamic random-access memory (DRAM), and other types of RAM. ROM 808 includes erasable programmable read-only memory (EPROM), electrically erasable programmable read-only memory (EEPROM), flash memory, and NAND flash. Memories 804 of the computing device(s) 800 may also include removable storage, non-removable storage, and/or local storage 810 to provide long- or short-term storage of computer-readable instructions, data structures, program modules, and other data.

The memories 804 are an example of computer-readable media. Computer-readable media includes at least two types of media: computer-readable storage media and communications media. Computer-readable storage media includes volatile and non-volatile, removable and non-removable media implemented in any method or technology for storage of information such as computer readable instructions, data structures, program modules, or other data, RAM 806, ROM 808, flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable storage media does not include transitory media such as modulated data signals and carrier waves.

In contrast, communications media may embody computer-readable instructions, data structures, program modules, or other data in a modulated data signal, such as a carrier wave, or other transmission mechanism. As defined herein, computer-readable storage media and communications media are mutually exclusive.

In one implementation, the memories 804 may include a plurality of databases such as the data repository 102. However, as noted above, in other examples the data repository 102 may be separate from the both the memories 804 and the computing device(s) 800. The one or more data repositories 102 may contain a collection of patent documents such as issued patents or published patent applications. The collection of patents or patent applications may be defined by, for example, a portfolio of a patent owner, a classification of a taxonomy (e.g., public taxonomy such as a classification system of a patent office or governmental agency, a private taxonomy such as a taxonomy for a private company, a taxonomy set by a standards body or an industry, etc.), results of a search, or any other collection of patent documents.

By way of example and not limitation, the memories 804 may also include multiple words and/or phrases such as the stop words 108 and the acronyms and abbreviations 110 as shown in FIG. 1 as well as other words such as normative words 812. Any or all of the collections words and/or phrases may be stored in the memories 804 as lists or may be directly included into computer code corresponding to one of the modules described below.

A filtering module 814 may be present in the memories 804 and coupled to the one or more processing unit(s) 802. The filtering module 814 may modify the data obtained from the data repository 102 to generate a reduced set of data that is the corpus of documents for subsequent analysis. The filtering module 814 may perform any or all of the method 300 shown in FIG. 3. The filtering module 814 places documents from the data repository 102 that are retained post filtering into local storage 810 of the computing device(s) 800. Presence of the filtered documents in the local storage 810 may provide for faster analysis by the other modules as compared to accessing the documents in a remote storage location.

A pre-processing module 816 may be present in the memories 804 and coupled to the one or more processing unit(s) 802. The pre-processing module 816 may process document portions such as patent claims prior to determination of breadth. This pre-processing may include delimiting individual claims, stemming words to root forms, removing duplicate root forms, and removing stop words 108. The pre-processing module 816 may perform any or all of method 400 shown in FIG. 4. In an implementation, the stop words 108 may come from a stop word adjustment file that is read in and used for the processing of document portions. The stop word adjustment file may be specific to a given portfolio or corpus of documents.

The pre-processing module 816 may include stemming logic 818. The stemming logic 818 generates root forms of words using a stemming algorithm. A stemming algorithm is a process of linguistic normalization, in which the variant forms of a word are reduced to a common form or a root form. There are many possible stemming algorithms which may be used including use of a lookup table, suffix stripping, Lemmatisation, stochastic algorithms, n-gram analysis, matching algorithms, Porter, Porter2, Paice-Husk, Lovins, and Porter Stemmer. Porter stemmer follows the algorithm presented in Porter, M "An algorithm for suffix stripping." Program 14.3 (1980): 130-137. The stemming logic 818 may function in part by passing values to an external stemming operation and receiving results back. One technique for implementing this is by using an API to call an external module or computing system that provides stemming functionality. An application program interface (API) is a set of routines, protocols, and tools for building software applications. An API specifies how software components should interact. APIs that provide stemming include EnClout Stemmer, EnClout Term Analysis, and Text-Processing.

An anomaly detection module 820 may be present in the memories 804 and coupled to the one or more processing unit(s) 802. The anomaly detection module 820 may detect two types of anomalies: anomalies that lead to removal of a patent claim from further analysis and anomalies that result in flagging a patent claim for manual review. The anomaly detection module 820 may include claim removal logic 822 that is configured to detect and remove dependent claims and deleted claims from the claims under consideration for analysis of breadth. Removing the dependent claims and/or deleted claims may include deleting records corresponding to those claims or indicating that the records correspond to the claims are to be ignored during subsequent analysis. Claim flagging logic 824 which may also be present in the anomaly detection module 820 is configured to generate a flag or other indicium that is associated with those flags which have a type of anomaly that warrants further evaluation but not removal. The anomaly detection module 820 may perform any or all of method 500 shown in FIG. 5. The anomaly detection module 820 may additionally or alternatively contain the first set of rules described in block 704 of FIG. 7.

The anomaly detection module 820 may reference one or more lists of stop words 108 and/or normative words 812. The referencing may be done during processing by reading in a list or the list may be integrated into the code that is performing the anomaly detection. In either implementation, part of the section may include a comparison between words in a portion of a document and "anomalous" words. This comparison may be implemented in part by use of one or more lookup tables. The lookup tables may be pre-calculated and stored in static program storage, calculated (or "pre-fetched") as part of a program's initialization phase (memorization), or even stored in hardware in application-specific platforms. In some programmatic implementations, the lookup tables may include pointer functions (or offsets to labels) to process the matching input. To improve processing speed, one or more field-programmable gate arrays (FPGA) may use reconfigurable, hardware-implemented, lookup tables to provide programmable hardware functionality. For example, and to potentially increase processing speed, a list of default stop words and/or a list of the normative words 812 could be configured as hardware-implemented lookup tables.

A breadth calculation module 826 may be present in the memories 804 and coupled to the one or more processing unit(s) 802. The breadth calculation module 826 may be configured to calculate a breadth score for individual document portions. If the individual document portions are patent claims, then the breadth calculation module 826 may calculate claim breadth scores for each of individual claims. This calculation may be performed only for the claims or other document portions that are not removed by either the pre-processing module 816 or the anomaly detection module 820. As described above, breadth is based on a word count score and a commonest score. Thus, the breadth calculation module 826 may include one or both of a word count score calculation module 828 and a commonness score calculation module 830. The breadth calculation module 826 may perform any or all of operations 608, 610, 612, 614, 616, 618, 620, 622 of method 600 shown in FIG. 6.

The word count score calculation module 828 may be configured to determine a word count score for a claim based on a word count for the claim and a maximum word count for another claim that has the highest word count. The claim under analysis and the other claim with the highest word count are both drawn from the same corpus of patent documents. Thus, the word count score calculation module 828 may determine a word count for each claim under analysis and identify which of those claims has the most words. In an implementation, the word count score calculation module 828 may contain the second set of rules described in block 714 of FIG. 7.

The commonness score calculation module 830 may be configured to determine a commonness score for the claim based on the frequencies individual words in the claim occur throughout all of the claims in the corpus of patent documents. The commonness score calculation module 830 may determine a commonness score for each claim under analysis and identify which of those claims is the most "common" due to having the highest commonness score. The ratio of a claim's individual commonness score and the highest commonness score may be used to represent the commonness score for that claim for the purposes of calculating breadth. In an implementation, the commonness score calculation module 830 may contain the third set of rules described in block 716 of FIG. 7. The breadth calculation module 826 may combine results generated by the word count score calculation module 828 and the commonness score calculation module 830 to generate a breadth score for each claim or other document portion. The breadth score for each claim or document portion may be generated in a manner similar to that described by block 622 in FIG. 6 or block 718 in FIG. 7.

A ranking module 832 may be present in the memories 804 and coupled to the one or more processing unit(s) 802. The ranking module 832 may be configured to rank the analyzed documents or document portions by order of breadth. For example, the ranking module 832 may rank a number of published patent applications by the breadth of the claims contained in those applications. The ranking module 832 may also rank individual claims of a particular patent or patent application to identify which is the broadest claim. Some types of documents may have multiple portions that can be assigned a breadth score. For example, patent documents may have multiple claims and more specifically multiple independent claims. The ranking module 832 may assign a document a single breadth score based on the breadth scores of one or more of the portions of the document. For example, the breadth score of a patent document may be the claim breadth score of the highest ranked independent claim in that patent document. The documents may then be ranked based on these breadth scores derived from their broadest document portion. Alternatively, the breadth scores assigned to document may be based on the breadth of a lowest ranked document portion, an average of the rankings of the multiple document portions, a median of the rankings the multiple document portions, or another metric derived from the individual breadth scores of portions of a document.

In an implementation, the ranking module 832 may additionally bin the results of the ranking into one of a set number of values. One binning implementation is by percentiles. Thus, the top 1% of the analyzed documents in terms of breadth would be all the given a rank of 100 even if the individual documents had slightly different breadth scores. The binning may divide the ranked documents into any number of different bins such as three different bins (e.g., high, medium, and low), 10 different bins, 100 different bins, or more. Thus, instead of 100,000 documents ranked from 1 to 100,000 in terms of breadth with each ranking being unique, each document may have a rank from 1 to 100 with several documents sharing each numerical level.

Some of the operations described above include summation, subtraction, multiplication, and/or division. The processing unit(s) 802 may implement these operations by use of floating point computations. Floating point is a formulaic representation that approximates a real number so as to support a trade-off between range and precision. A number is, in general, represented approximately to a fixed number of significant digits (the significand) and scaled using an exponent in some fixed base; the base for the scaling is normally two, ten, or sixteen. A number that can be represented exactly is of the following form: significand x $base^{exponent}$, where significand is an integer base is an integer greater than or equal to two, and exponent is also an integer. The term floating point refers to the fact that a number's radix point (decimal point, or, more commonly in computers, binary point) can "float"; that is, it can be placed anywhere relative to the significant digits of the number. This position is indicated as the exponent component, and thus the floating-point representation is a form of scientific notation.

A floating-point system can be used to represent, with a fixed number of digits, numbers of different orders of magnitude. The result of this dynamic range is that the numbers that can be represented are not uniformly spaced; the difference between two consecutive representable numbers grows with the chosen scale. One example technique for floating point calculation is described in the IEEE 754 Standard. The current version, IEEE 754-2008 published in August 2008. The international standard ISO/IEC/IEEE 60559:2011 (with content identical to IEEE 754-2008) is published as ISO/IEC/IEEE 60559:2011 "Information technology—Microprocessor Systems—Floating-Point arithmetic."

A floating-point number consists of two fixed-point components, whose range depends exclusively on the number of bits or digits in their representation. The components linearly depend on their range, the floating-point range linearly depends on the significant range and exponentially on the range of exponent component, which attaches outstandingly wider range to the number. On an example computer system, a 'double precision' (64-bit) binary floating-point number has a coefficient of 53 bits (one of which is implied), an exponent of 11 bits, and one sign bit. Positive floating-point numbers in this format have an approximate range of $10^{-308}$ to $10^{308}$, because the range of the exponent is [−1022, 1023] and 308 is approximately $\log_{10}(2^{1023})$. The complete range of the format is from about $-10^{308}$ through $+10^{308}$ (see IEEE 754).

The number of normalized floating-point numbers in a system (B, P, L, U) where B is the base of the system, P is the precision of the system to P numbers, L is the smallest exponent representable in the system, and U is the largest exponent used in the system) is $2(B-1)(BP-1)(U-L+1)+1$.

There is a smallest positive normalized floating-point number, Underflow level=UFL=BL which has a 1 as the leading digit and 0 for the remaining digits of the significand, and the smallest possible value for the exponent. There is a largest floating-point number, Overflow level=OFL=(1−B−P)(BU+1) which has B−1 as the value for each digit of the significand and the largest possible value for the exponent.

A UI generation module 834 may be present in the memories 804 and implemented by the processing unit(s) 802. The UI generation module 834 may generate or provide instructions to generate one or more user interfaces such as command-line user interfaces and/or graphic user interfaces. A command-line interface (also known as a command language interpreter (CLI), a command-line user interface, a console user interface, or a character user interface (CUI)), is an interface for interacting with a computer program where the user (or client) issues commands to the program in the form of successive lines of text (command lines). The interface is usually implemented with a command line shell, which is a program that accepts commands as text input and converts commands to appropriate operating system functions.

A GUI is a program interface that takes advantage of a computer's graphics capabilities to make the program easier to use. Well-designed GUIs can free a user from learning complex command languages. In one implementation, the UI generation module 834 may generate a GUI such as the UI 118 shown in FIGS. 1 and 2.

The computing device(s) 800 may include one or more communication interfaces 836 for receiving and sending information. The communication interfaces 836 may communicatively couple the computing device(s) 800 to a communications network using any conventional networking protocol or technology. The computing device(s) 800 may also include input-output (I/O) components 838 for receiving input from human operators (e.g., a keyboard) and providing output (e.g., a monitor) to the human operators.

EXAMPLE

A data repository containing 8821 different issued U.S. utility patents related to computer security was evaluated by three different automatic breadth scoring techniques. One of the automatic techniques was the technique described in this disclosure (referred to a "Claim Breadth"). The others were Innography PatentStrength® and the Relecura Star Rating. Innography PatentStrength® is a proprietary algorithm that predicts patent value and relevance, by deriving the likelihood that a patent will eventually be litigated. The score assigned by Innography PatentStrength® ranges from 0-100 with 100 being the "best." The Relecura Star Rating is a different proprietary algorithm that predicts patent quality and ranges from 0-5 in increments of 0.5 (i.e., 10 different bins). A human experienced in evaluating patent claim scope manually reviewed 10 patents selected from the 8821.

Automatic document analysis using the techniques described in this disclosure were able to score and rank the 8821 patents in 2714 seconds or 30.8 seconds per patent. Manual analysis of only 10 patents took between 10 and 30 minutes per patent. Thus with this technique, automatic document analysis provides a significant speed advantage over manual analysis.

The automatic document analysis technique described in this disclosure also provided results closer to the manual analysis than did the other automatic techniques. Thus, the techniques described here may be described as more effective at emulating the results generated by a human than Innography PatentStrength® or Relecura Star Rating. Table 1 below shows the ranking of the patents as ordered by human analysis and the rankings generated by the techniques of this disclosure ("Claim Breadth"), Innography PatentStrength®, and Relecura Star Rating.

niques. Claim Breadth did not have any significant errors and correctly placed six of the 10 patents within the same broad group as the manual ranking. Thus, the Claim Breadth technique of this disclosure earned six points. Innography PatentStrength® had two significant errors and only placed four patents with the same broad groups as the manual ranking thereby earning two points. The Relecura Star Rating also had two significant errors and placed two patents within the same broad group as the manual ranking. Thus, Relecura Star Rating received zero points. The ranking generated by Claim Breadth is also much more correlated to the human ranking than either Innography PatentStrength® or Relecura Star Rating. Correlation is a measure of how strongly two variables are related to each other. A correlation of +100% indicates a perfect positive correlation, −100% indicates a perfect negative correlation, and 0% indicates no correlation. Claim Breadth had a 72.12% correlation with the human ranking. This is highly positive and indicates that a ranking generated by Claim Breadth is likely to be similar to that generated by manual analysis. Innography PatentStrength® had a slightly negative correlation at −23.78% indicating that ranking generated by Innography PatentStrength® is likely to be only somewhat similar to the ranking generated by manual analysis but ordered in the opposite direction. The Relecura Star Rating had essentially

TABLE 1

Comparative Patent Rankings

| | | Human | Claim Breadth | | Innography | | Relecura | |
|---|---|---|---|---|---|---|---|---|
| | Pat. No. | Rank | Raw | Ranked | Raw | Ranked | Raw | Ranked |
| broad | '493 | 1 | 96 | *1* | 90 | 4 | 3 | 5 |
| | '409 | 2 | 55 | 5 | 22 | 10* | 2.5 | 9* |
| | '350 | 3 | 46 | 6 | 91 | *2* | 3.5 | *1* |
| medium | '187 | 4 | 86 | *2* | 54 | 9 | 3 | *5* |
| | '074 | 5 | 66 | *4* | 83 | *7* | 3.5 | 1 |
| | '250 | 6 | 35 | *7* | 93 | 1 | 3.5 | 1 |
| | '041 | 7 | 75 | 3 | 87 | *6* | 2.5 | 9 |
| narrow | '583 | 8 | 6 | *10* | 69 | *8* | 3.5 | 1* |
| | '437 | 9 | 23 | *8* | 91 | 2* | 3 | 5 |
| | '146 | 10 | 14 | *9* | 90 | 4 | 3 | 5 |

All of the automatic ranking techniques generated results different from each other and from manual evaluation by the human expert. In order to assess the rough correlation of an automatic ranking technique to the manual, human ranking, the 10 patents were grouped into three groups by breadth as determined through human analysis. The three broadest patents were included in a broad group. The middle four patents were included in a middle group. And the narrowest three patents were included in a narrow group.

Each automatic analysis technique that correctly ranked a patent in the same group as the manual ranking is given a point for placing the patent in the correct group: broad, middle, or narrow. This is indicated in Table 1 by the ranking being in italics. Thus, if the patent ranked number 1 by manual analysis was ranked 1, 2, or 3 by an automatic technique, then that automatic technique received a point for correctly ranking that patent in the broad group. The automatic analysis techniques also lost a point if they made a significant error by placing one of the patents from the narrow group in the broad group or vice versa. Significant errors are indicated in Table 1 by the ranking being followed by an asterisk.

Examination of Table 1 shows that Claim Breadth performed better than the other two automatic analysis techno correlation with a value of −9.30%. Thus, the techniques disclosed herein are quantitatively shown to provide more human-emulative patent claim scope ranking than other analytical techniques used by the patent analysis industry.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

The terms "a," "an," "the" and similar referents used in the context of describing the invention (especially in the context of the following claims) are to be construed to cover both the singular and the plural, unless otherwise indicated herein or clearly contradicted by context. As used herein in this document "or" means and/or. For example, "A or B" means A without B, B without A, or A and B. The term "based on" is to be construed to cover both exclusive and nonexclusive relationships. For example, "A is based on B" means that A is based at least in part on B and may be based wholly on B.

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

Furthermore, references have been made to publications, patents, or patent applications (collectively "references") throughout this specification. Each of the cited references is individually incorporated herein by reference for their particular cited teachings as well as for all that they disclose.

The invention claimed is:

1. A computer-implemented method comprising:
    receiving a plurality of documents containing text written in a type of natural language, each document associated with a unique document identification number;
    representing text included in the plurality of documents using unique computer representations for each word in the text, the computer representations comprising ASCII, Unicode, or an equivalent technology;
    preprocessing the plurality of documents by:
        generating one or more document portions from each of the plurality of documents, each one of the document portions associated with one of the unique document identification numbers;
        parsing the text included in the plurality of documents into separate words based at least in part on each word's associated computer representation;
        identifying stop words, duplicate words, and punctuation in the text based at least in part on the respective computer representation associated with the individual stop words, duplicate words, and punctuation; and
        removing the stop words, duplicate words, and punctuation from the text;
    generating a word count for each of the document portions by counting the number of computer representations of separate words in each one of the document portions;
    identifying a referential word count;
    calculating a word count ratio for each of the document portions by dividing the referential word count by the word count for each individual one of the document portions;
    determining, based at least in part on the computer representations, a word frequency for each word included in the document portions, the word frequency being a total number of instances that a word is found in the document portions prior to removal of duplicate words;
    generating a commonness score for each of the document portions by taking the square root of the sum of the squares of the inverse of the word frequency for each one of the separate words in the individual ones of the document portions;
    identifying a document portion of the document portions having a highest commonness score;
    calculating a commonness score ratio for each of the document portions by dividing the highest commonness score by the commonness score for the individual ones of the document portions;
    calculating an overall score for each of the document portions based on a normalization of the square root of the sum of the square of the word count ratio and the square of the commonness score ratio for the individual ones of the document portions; and
    generating a user interface including at least one overall score for one of the document portions in proximity to the unique document identification number associated with the one of the document portions and an indicia indicating one or more anomalies for the one of the document portions.

2. The computer-implemented method of claim 1, wherein the preprocessing further comprises:
    identifying, based at least in part on the type of natural language, a listing of the stop words and the duplicate words specific to patent laws of a jurisdiction associated with the type of natural language; and
    determining a computer representation associated with each of the stop words and the duplicate words for the type of natural language.

3. The computer-implemented method of claim 2, wherein the listing comprises a first listing of first stop words and first duplicate words, and wherein identifying the first listing comprises:
    querying a database including:
        first computer representations of the first stop words and the first duplicate words, the first stop words and first duplicate words corresponding to words written in the type of natural language, wherein the type of natural language includes a first type of natural language that is a natural language other than English; and
        second computer representations of second stop words and second duplicate words included in a second listing, the second stop words and second duplicate words corresponding to a second type of natural language that includes words written in English; and
    selecting the first listing of the first stop words and the first duplicate words based at least in part on the type of natural language.

4. The computer-implemented method of claim 1, wherein the preprocessing of the plurality of documents is performed independent of a translation of the text from the type of natural language to another type of natural language.

5. The computer-implemented method of claim 4, wherein the type of natural language comprises a natural language other than English, and the other type of natural language comprises English.

6. The computer-implemented method of claim 1, wherein the plurality of documents containing text comprise patents, the unique document identification numbers comprise patent numbers, and the document portions comprise patent claims.

7. A method for automatically assigning a claim breadth score to a patent claim, the method comprising:
    obtaining a data file including a corpus of patent claims that include the patent claim;
    obtaining a first set of rules that defines an anomalous patent claim, the first set of rules comprising a first rule for identifying at least one of a dependent patent claim, a deleted patent claim, a means-plus-function patent claim, or a patent claim containing normative language; and at least one of:

generating an ignore list for patent claims included in the corpus of patent claims by applying the first set of rules; or generating an indicium marking the patent claim by applying the first set of rules;

determining a jurisdiction in which the patent claim was filed;

determining substantive law associated with the jurisdiction;

obtaining a second set of rules that define a word count score for the patent claim as a function of word count in the patent claim;

obtaining a third set of rules that define a commonness score for the patent claim as a function of the frequency with which words in the patent claim are present in the corpus of patent claims;

generating the word count score and the commonness score for the patent claim by evaluating the patent claim against the second set of rules and the third set of rules;

generating a claim breadth score for the patent claim based at least in part on the word count score, the commonness score, and the substantive law associated with the jurisdiction; and producing, based at least partly on the claim breadth score, a ranking of the patent claim with respect to a plurality of other patent claims from the corpus of patent claims.

8. The method of claim 7, wherein the jurisdiction in which the patent claim was filed comprises China, and the substantive law comprises including words of a preamble of the patent claim in the word count in the patent claim.

9. The method of claim 7, wherein the jurisdiction in which the patent claim was filed comprises the United States of America, and the substantive law comprises excluding words of a preamble of the patent claim in the word count in the patent claim.

10. The method of claim 7, wherein when the ignore list is generated by applying the first set of rules, the word count score and the commonness score are not generated for patent claims included in the ignore list.

11. The method of claim 7, wherein the second set of rules comprises a second rule defining the word count score as based on a number of words in the patent claim following pre-processing of the patent claim, wherein pre-processing the patent claim comprises stemming, removal of duplicate words, and removal of stop words.

12. The method of claim 7, wherein the third set of rules comprises a third rule defining the commonness score as based on a per-claim commonness score, the per-claim commonness score calculated by a square root of a sum of, for each word in the patent claim following pre-processing, the square of the inverse of a global word count for each word.

13. One or more computing devices for automatically analyzing a corpus of patent documents, the one or more computing devices comprising:
one or more processing units;
one or more memories coupled to the one or more processing units and storing computer-readable instructions that, when executed by the one or more processing units, perform operations comprising;
for a first point in prosecution for a first portion of the corpus of patent documents:
processing claim sections of the first portion of the corpus of patent documents by delimiting individual claims, stemming words in the individual claims to root forms, removing duplicate root forms from the individual claims, and removing stop words from the individual claims;
detecting and removing dependent claims and deleted claims from the individual claims of the first portion of the corpus of patent documents; and
calculating a first claim breadth score for each individual claim of the first portion of the corpus of patent documents that are not removed, the individual first claim breadth scores being based on a word count score of a first individual claim and a commonness score of the first individual claim;
for a second point in prosecution for the first portion of the corpus of patent documents:
processing the claim sections of the first portion of the corpus of patent documents by delimiting individual claims, stemming words in the individual claims to root forms, removing duplicate root forms from the individual claims, and removing stop words from the individual claims;
detecting and removing dependent claims and deleted claims from the individual claims of the first portion of the corpus of patent documents; and
calculating a second claim breadth score for each of individual claim of the first portion of the corpus of patent documents that are not removed, the second individual claim breadth scores being based on a word count score of a second individual claim and a commonness score of the second individual claim.

14. The one or more computing devices of claim 13, wherein:
the first point in prosecution comprises a first time prior to amendments being made to the individual claims of the first portion of the corpus of patent documents; and
the second point in prosecution comprises a second time associated with a notice of allowance of the individual claims of the first portion of the corpus of patent documents.

15. The one or more computing devices of claim 14, wherein the one or more memories store additional computer-readable instructions that, when executed by the one or more processing units, perform additional operations comprising determining an average change in claim breadth score between the first claim breadth scores and the second claim breadth scores.

16. The one or more computing devices of claim 15, wherein:
the first portion of the corpus of patent documents corresponds to invention patents;
a second portion of the corpus of patent documents corresponds to utility model patents; and
the one or more memories store further computer-readable instructions that, when executed by the one or more processing units, perform further operations comprising determining a third claim breadth score for individual claims in the second portion of the corpus of patent documents based at least in part on the average change in claim breadth scores between the first claim breadth scores and the second claim breadth scores.

17. The one or more computing devices of claim 16, wherein each patent of the corpus of patent documents are associated with a common classification, the common classification comprising at least one of:
a jurisdiction;
a technology classification;

an assignee;

an applicant; or an inventor.

18. The one or more computing devices of claim 13, wherein the one or memories store additional computer-readable instructions that, when executed by the one or more processing units, perform additional operations comprising determining a word count score for each of the individual claims based on a word count for each of the individual claims and a maximum word count for a claim from the corpus of patent documents having a highest word count.

19. The one or more computing devices of claim 13, wherein the one or memories store additional computer-readable instructions that, when executed by the one or more processing units, perform additional operations comprising generating a user interface including a respective ranking, a respective claim breadth score, and a respective anomaly for at least a portion of the individual claims included in the corpus of patent documents.

20. The one or more computing devices of claim 13, wherein the one or memories store additional computer-readable instructions that, when executed by the one or more processing units, perform additional operations comprising determining a commonness score for each of the individual claims based on frequencies of individual words in each of the individual claims occurring throughout all of the claims in the corpus of patent documents.

* * * * *